(12) United States Patent
Newnham et al.

(10) Patent No.: US 8,909,644 B2
(45) Date of Patent: *Dec. 9, 2014

(54) REAL-TIME ADAPTIVE BINNING

(75) Inventors: Leonard Michael Newnham, Buckingham (GB); Jason Derek McFall, London (GB)

(73) Assignee: Nice Systems Technologies UK Limited, Southampton (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/479,911

(22) Filed: May 24, 2012

(65) Prior Publication Data

US 2012/0303598 A1 Nov. 29, 2012

Related U.S. Application Data

(60) Provisional application No. 61/490,232, filed on May 26, 2011.

(51) Int. Cl.
*G06F 17/30* (2006.01)
*G06Q 30/02* (2012.01)

(52) U.S. Cl.
CPC .......... *G06Q 30/02* (2013.01); *G06F 17/30893* (2013.01)
USPC .......................................... 707/737; 707/693

(58) Field of Classification Search
USPC .......................... 707/737, 736, 693, 741, 764
See application file for complete search history.

(56) References Cited

U.S. PATENT DOCUMENTS

| 4,320,458 | A | * | 3/1982 | Vincent ............................. 702/6 |
| 5,467,428 | A | | 11/1995 | Ulug |
| 5,960,431 | A | | 9/1999 | Choy |
| 6,317,752 | B1 | | 11/2001 | Lee et al. |
| 6,438,552 | B1 | * | 8/2002 | Tate .............................. 707/764 |
| 6,539,391 | B1 | * | 3/2003 | DuMouchel et al. ................. 1/1 |

(Continued)

FOREIGN PATENT DOCUMENTS

| JP | 2006-048319 | 2/2006 |
| JP | 2009-076027 | 4/2009 |

(Continued)

OTHER PUBLICATIONS

U.S. Appl. No. 13/631,032, "Online asynchronous reinforcement learning from concurrent customer histories," Newnham et al., filed Sep. 28, 2012.

(Continued)

*Primary Examiner* — Jean M Corrielus
(74) *Attorney, Agent, or Firm* — Pearl Cohen Zedek Latzer Baratz LLP

(57) ABSTRACT

In one embodiment, a set of boundaries may be obtained, where the set of boundaries includes boundaries for each of one or more bins. The boundaries for each of the one or more bins may include a lower boundary and an upper boundary, wherein the set of boundaries of the one or more bins together defines a contiguous range of data values capable of being stored in the one or more bins. A data value may be obtained. The data value may be added to one of the one or more bins according to the boundaries of the one or more bins. It may be determined whether to modify the set of boundaries. The set of boundaries may be adjusted according to a result of the determining step.

48 Claims, 18 Drawing Sheets

(56) References Cited

U.S. PATENT DOCUMENTS

| | | | |
|---|---|---|---|
| 6,549,910 B1* | 4/2003 | Tate ........................................ 1/1 |
| 6,553,366 B1* | 4/2003 | Miller et al. ............................ 1/1 |
| 6,826,556 B1* | 11/2004 | Miller et al. ................... 707/764 |
| 6,993,578 B1* | 1/2006 | Dmitroca ....................... 709/224 |
| 7,043,500 B2* | 5/2006 | Leary ..................................... 1/1 |
| 7,174,343 B2 | 2/2007 | Campos et al. |
| 7,174,344 B2 | 2/2007 | Campos et al. |
| 7,676,751 B2 | 3/2010 | Allen et al. |
| 7,739,096 B2* | 6/2010 | Wegerich et al. ............... 703/17 |
| 8,131,503 B2* | 3/2012 | Weber ........................... 702/180 |
| 8,620,840 B2* | 12/2013 | Newnham et al. .............. 706/12 |
| 2002/0073021 A1 | 6/2002 | Ginsberg et al. |
| 2003/0009470 A1* | 1/2003 | Leary .............................. 707/100 |
| 2003/0055796 A1 | 3/2003 | Shetty et al. |
| 2003/0149676 A1 | 8/2003 | Kasabov |
| 2004/0220834 A1 | 11/2004 | Pellinat |
| 2005/0021649 A1 | 1/2005 | Goodman et al. |
| 2005/0102292 A1* | 5/2005 | Tamayo et al. .................. 707/10 |
| 2006/0224535 A1 | 10/2006 | Chickering et al. |
| 2006/0282444 A1 | 12/2006 | Chen et al. |
| 2009/0043593 A1 | 2/2009 | Herbrich et al. |
| 2009/0063388 A1 | 3/2009 | Kim et al. |
| 2009/0098515 A1 | 4/2009 | Das et al. |
| 2009/0164657 A1 | 6/2009 | Li et al. |
| 2010/0030518 A1* | 2/2010 | Weber ........................... 702/180 |
| 2010/0057560 A1 | 3/2010 | Skudlark et al. |
| 2010/0057717 A1 | 3/2010 | Kulkarni |
| 2010/0138370 A1 | 6/2010 | Wu et al. |
| 2011/0040635 A1 | 2/2011 | Simmons et al. |
| 2011/0119267 A1 | 5/2011 | Forman et al. |
| 2011/0125745 A1 | 5/2011 | Bright |
| 2012/0078904 A1 | 3/2012 | Agrawal et al. |
| 2012/0166400 A1 | 6/2012 | Sinclair et al. |
| 2012/0197895 A1 | 8/2012 | Isaacson et al. |
| 2012/0303598 A1 | 11/2012 | Newnham et al. |
| 2012/0303621 A1 | 11/2012 | Newnham et al. |
| 2013/0024405 A1* | 1/2013 | Newnham et al. .............. 706/12 |
| 2013/0080358 A1* | 3/2013 | Newnham et al. .............. 706/12 |
| 2013/0080377 A1* | 3/2013 | Newnham et al. .............. 706/52 |
| 2013/0110750 A1 | 5/2013 | Newnham et al. |
| 2013/0124522 A1 | 5/2013 | Moser et al. |

FOREIGN PATENT DOCUMENTS

| | | |
|---|---|---|
| JP | 2011-053735 | 3/2011 |
| WO | 2012/162485 | 11/2012 |
| WO | 2013/012898 | 1/2013 |

OTHER PUBLICATIONS

U.S. Appl. No. 13/631,053, "Online asynchronous reinforcement learning from concurrent customer histories," Newnham et al., filed Sep. 28, 2012.

U.S. Appl. No. 13/655,298, "Online temporal difference learning from incomplete customer interaction histories," Newnham et al., filed Oct. 18, 2012.

Sutton, Richard et al., "Reinforcement learning: an introduction," MIT Press (1998).

Maei, H. et al., "Convergent temporal-difference learning with arbitrary smooth function approximation," In Advances in Neural Information Processing Systems 22, (2009) 1204-1212.

Russell, Stuart et al., "Artificial intelligence: a modern approach," (2nd ed.), Upper Saddle River, New Jersey: Prentice Hall (2003) pp. 111-114, ISBN 0-13-790395-2.

WO patent application No. PCT/US2012/039320, International Search Report and Written Opinion mailed Nov. 26, 2012.

WO patent application No. PCT/US2012/047147, International Search Report and Written Opinion mailed Jan. 14, 2013.

U.S. Appl. No. 13/479,917, Office Action mailed May 23, 2013.

WO patent application No. PCT/US2012/058010, International Search Report and Written Opinion mailed Feb. 22, 2013.

WO patent application No. PCT/US2012/060904, International Search Report and Written Opinion mailed Mar. 29, 2013.

U.S. Appl. No. 13/552,519, Office Action mailed Jun. 24, 2013.

Office action from U.S. Appl. No. 13/479,917, filed Jan. 31, 2014.

* cited by examiner

REAL-TIME ADAPTIVE BINNING

RELATED APPLICATIONS

This application claims priority from Provisional Application No. 61/490,232, entitled "REAL-TIME ADAPTIVE BINNING", by Newnham et al., filed on May 26, 2011, which is incorporated herein by reference for all purposes.

This application is related to U.S. patent application Ser. No. 13/479,917, entitled "REAL-TIME ADAPTIVE BINNING THROUGH PARTITION MODIFICATION", by Newnham et al, filed on even date herewith, which is incorporated herein by reference for all purposes.

BACKGROUND OF THE INVENTION

Machine learning may be applied to automatically generate an algorithm that is improved through experience. Applications of machine learning range from data mining programs that discover general rules in large data sets, to information filtering systems that automatically learn users' interests. The algorithm that is automatically generated and updated is often referred to as a model. Many machine learning techniques are known to produce better models by discretizing continuous variables.

Discretization refers to the process of partitioning a data set pertaining to a continuous variable into intervals, which may be referred to as bins. Typically, data is discretized into bins of equal width, where the width corresponds to a range of possible data values. However, since the data values and distribution of the data values are unpredictable, data values are often distributed unequally across the bins. If a large proportion of the data fall into a small number of bins then discriminatory power is lost. Conversely, if too little data falls into one or more bins then the ability of the model to generalize to previously unseen inputs is compromised. In either case, the model generated from the binned data is likely to be suboptimal.

A common approach to distribute data values equally across the bins is to perform the binning operation offline. As a result, the binning and resulting model will typically not reflect the most recently received and most valuable data. As a result, decisions generated from the model may be based upon data that is outdated or irrelevant to the decision making process.

SUMMARY OF THE INVENTION

The disclosed embodiments support real-time adaptive binning where new data can be continually added and the bins updated to optimally distribute data. This may be accomplished through the modification of a set of bin boundaries and/or a set of partitions as data values are received and binned. In this manner, data values may be distributed across a set of bins.

In accordance with one aspect, real-time adaptive binning may be performed through the modification of a set of bin boundaries. More particularly, a set of boundaries may be obtained, wherein the set of boundaries includes boundaries for each of one or more bins. The boundaries for each of the one or more bins may include a lower boundary and an upper boundary, wherein the set of boundaries of the one or more bins together define a contiguous range of data values capable of being stored in the one or more bins. A data value may be obtained and added to one of the one or more bins according to the boundaries of the one or more bins. It may be determined whether to modify the set of boundaries. The set of boundaries may be modified according to a result of the determining step.

In accordance with another aspect, the determination of whether to modify the set of boundaries may result in a number of different determinations. More particularly, it may be determined that no modification of the set of boundaries (e.g., boundary adjustment) should be performed. In addition, it may be determined that one or more bin boundaries should be adjusted to increase a range of values represented by the set of bins, reduce the range of values represented by the set of bins, and/or reallocate data values among the set of bins. Moreover, it may be determined that one or more bin boundaries should be added (e.g., to add one or more bins) or eliminated (e.g., to eliminate one or more bins).

In accordance with another aspect, real-time adaptive binning may be performed through the adjustment of one or more bin boundaries. More particularly, boundaries for each of one or more bins may be obtained. The boundaries for each of the one or more bins may include a lower boundary and an upper boundary, wherein the boundaries of the one or more bins together define a contiguous range of data values capable of being stored in the one or more bins. A data value may be obtained and added to one of the one or more bins according to the boundaries of the one or more bins. It may be determined whether to perform a boundary adjustment for at least one of the one or more bins. At least one of the boundaries of at least one of the one or more bins may be adjusted according to a result of the determining step.

In accordance with yet another aspect, real-time adaptive binning may be performed through the modification of a set of partitions. More particularly, a set of partitions separating one or more bins from one another may be identified, each of the one or more bins having boundaries including a lower boundary and an upper boundary, wherein the boundaries of the one or more bins together define a contiguous range of data values capable of being stored in the one or more bins. A data value may be obtained and added to one of the one or more bins according to the boundaries of the one or more bins. It may be determined whether to modify the set of partitions. The set of partitions may be modified according to a result of the determining step.

In accordance with yet another aspect, the determination of whether to modify the set of partitions may result in a number of different determinations. More particularly, it may be determined that no modification (e.g., adjustment) of the set of partitions should be performed. In addition, it may be determined that one or more partitions should be adjusted to reallocate data values among the set of bins. Moreover, it may be determined that one or more partitions should be added (e.g., to add one or more bins) or eliminated (e.g., to eliminate one or more bins).

In accordance with yet another aspect, real-time adaptive binning may be performed through the adjustment of one or more partitions. More particularly, a set of one or more partitions separating one or more bins from one another may be identified, each of the one or more bins having boundaries including a lower boundary and an upper boundary, wherein the boundaries of the one or more bins together define a contiguous range of data values capable of being stored in the one or more bins. A data value may be obtained and added to one of the one or more bins according to the boundaries of the one or more bins. It may be determined whether to adjust at least one of the set of one or more partitions. At least one of the set of one or more partitions may be adjusted according to a result of the determining step.

DETAILED DESCRIPTION OF THE SPECIFIC EMBODIMENTS

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

The disclosed embodiments relate to real-time adaptive binning of data. Once binned, the binned data may be used for a variety of purposes. In accordance with one embodiment, the binned data may be applied to generate indexes, which may be used for the efficient retrieval of data in, for example, a database. In accordance with another embodiment, the binned data may be accessed by a machine learning system to generate or update a model. Automated decision making may be made on customer data based, at least in part, upon the model. Such decisions may include, but are not limited to, the serving of targeted content via a website or other mechanism.

In accordance with various embodiments, real-time adaptive binning may be applied to bin data associated with variable(s) of various types. In accordance with various embodiments, it is possible to bin data values for a particular variable where an order of the data values may easily be ascertained. More particularly, data values for a variable may be binned according to either an intrinsic order among the data values or an extrinsic order that cannot be ascertained solely from the data values. For example, for variables including ordinal, continuous, discrete, and binary variables, an intrinsic order among the data values (e.g., increasing numerical order) may be used to bin the data values. As another example, an extrinsic order may be ascertained for variables such as nominal variables (e.g., day of the week) through the use of a non-intrinsic quantity such as frequency. Accordingly, data values may be binned according to an order determined based, at least in part, upon a type of the particular variable.

Figure 1:
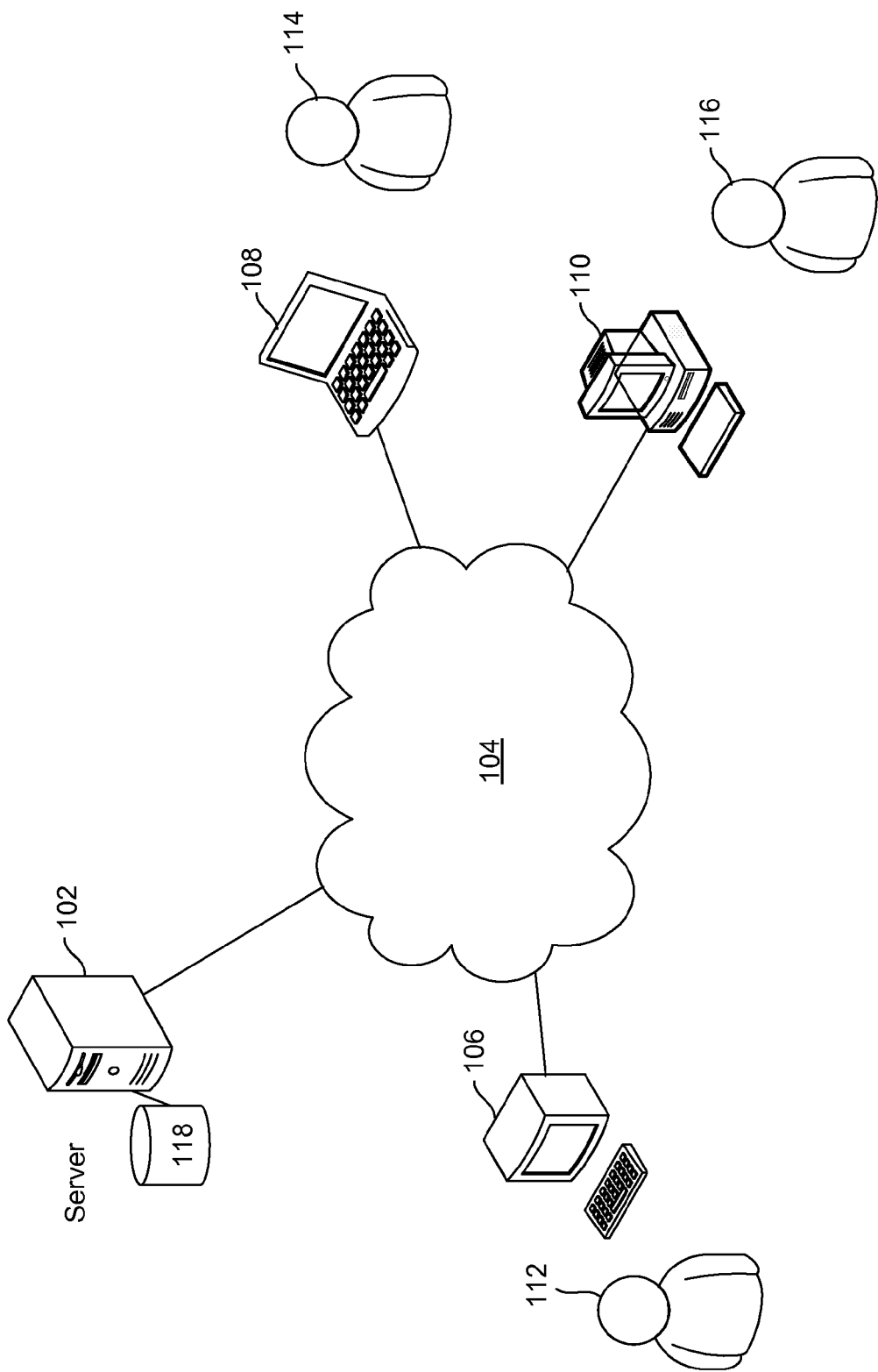
FIG. 1 is a block diagram illustrating an example network in which embodiments of the invention may be implemented.

The data that is binned may be received via a network for use in a variety of systems. FIG. 1 is a diagram illustrating an example network in which embodiments of the invention may be implemented. As shown in FIG. 1, the system may include one or more servers 102 associated with a website. The server(s) 102 may enable the website to provide a variety of services to its users. For examples, users of the website may purchase products via the website and/or perform searches via the website.

In this example, the server(s) 102 may obtain or otherwise receive data (e.g., customer profile data) and/or requests (e.g., search requests or purchase requests) via the Internet 104 from one or more computers 106, 108, 110 in association with corresponding entities 112, 114, 116, respectively. For example, each of the entities 112, 114, 116 may be an individual that is a user of the website.

The server(s) 102 may enable the users 112, 114, 116 to submit search queries via the website (e.g., to identify products that the user wishes to purchase) and/or purchase products via the website. In addition, the server(s) may enable the users 112, 114, 116 to generate and/or modify a customer profile pertaining to the user. The customer profile may define various features of the user. For example, the customer profile may include personal information such as residence address, zip code, gender, and/or age. In addition, the customer profile may include information pertaining to the user's website activities, such as search activities or purchase activities. Thus, the customer profile may include information pertaining to the user's previous purchases, credit card information, etc. The customer profile may also include information indicating the user's responses to customer decisions such as content serving decisions made by the server(s) 102. For example, the customer profile may store information indicating whether the user responded to a particular content serving decision by clicking on content (e.g., product information or offer(s)) provided to the user by the server(s) 102 or by purchasing a product represented by the content presented to the user by the server(s) 102. Customer profile information may be retained in a data store 118, which may correspond to multiple distributed devices and data stores.

In accordance with various embodiments, the server(s) 102 may perform real-time adaptive binning to store data values such as customer profile information in bins maintained in the data store 118, as will be described in further detail below. The binned data may be used for a variety of purposes including, but not limited to, generating and/or updating a model for use in automated decision making. More particularly, a model may be used together with customer profile information for a particular user (or set of users) to make a customer decision for that particular user (or set of users).

A customer decision may include one or more actions to be taken with respect to a user. A customer decision may be selected from a set of permissible actions that can be taken with respect to the particular user. For example, each of the set of permissible actions may be associated with a different category of user. As another example, a plurality of sets of permissible actions may be stored, where each set of permissible actions is associated with a different category of user. In this manner, it is possible to appeal to different segments of the population.

In accordance with various embodiments, a model may be applied to customer data to categorize a particular user or otherwise identify an appropriate customer decision. Thus, an action to be taken with respect to a user may be selected from a set of permissible actions based, at least in part, upon a result of applying the model to customer profile data of the user. As one example, a customer decision may include selection of targeted content such as one or more product suggestions or special offers to be served via the website or another mechanism such as electronic mail or Short Message Service (SMS) messages.

In accordance with various embodiments, a customer decision may be triggered via a trigger event. As one example, a trigger event may include the arrival of the user at a particular web page of the website. As another example, a trigger event may include the purchase of a particular product, the clicking on information pertaining to a particular product, or the saving of information pertaining to a particular product in the user's shopping cart.

A model may be generated and updated based, at least in part, upon data that has been binned. The generation or updating of a model may be performed via an automated machine learning system. Machine learning systems may periodically rebuild an off-line model using a current set of data then apply this model for decision making until the next rebuild. Alternatively, machine learning systems may incrementally update a model as customer decisions are made and responses to those customer decisions are known. Through the use of a model, predictions as to likely responses of users to system-generated customer decisions may be produced. Accordingly, a model may be applied to customer data to select a customer decision that is appropriate for a particular user.

In accordance with various embodiments, a machine learning system may incrementally update one or more models using binned data. Moreover, through the use of real-time adaptive binning, the binned data accessed by the machine learning system is incrementally updated. As a result, the disclosed embodiments are responsive to change by incorporating the most recent information into the model(s).

Figure 2:
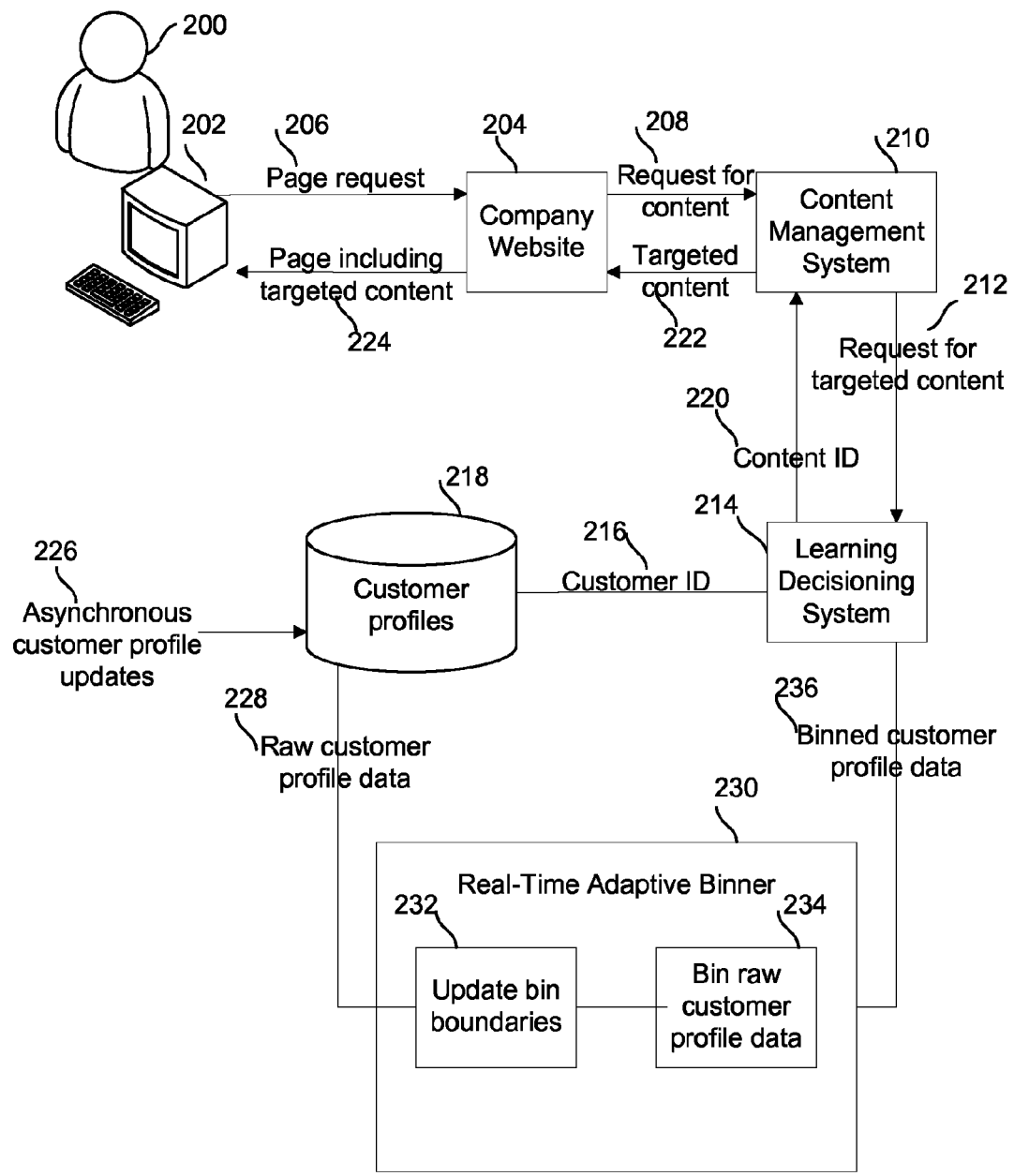
FIG. 2 is a block diagram illustrating an example system in which embodiments of the invention may be implemented.

In order to illustrate an example application of the real-time binning process and the advantages thereof, an example system in which the disclosed embodiments may be implemented will be described with reference to FIG. 2. As shown in FIG. 2, a user 200 may connect via a computer 202 via the Internet to a website such as a Company Website 204. More particularly, the user 200 may connect via a web browser of the computer 202, which submits a web page request 206 to the Company Website 204. Web pages are typically requested and served from web servers using Hypertext Transfer Protocol (HTTP).

Upon receiving the page request 206, the Company Website 204 may identify content that is appropriate to provide to the user 200. In this example, the Company Website 204 may send a request for content 208 to a Content Management System 210 that manages content that may be provided to users. More particularly, the Content Management System 210 may store content information for each of a plurality of content options, which may each be identified by a corresponding content identifier (ID). For example, content options may pertain to content such as products and/or special offers.

In accordance with various embodiments, each of a plurality of content options may pertain to a different one of a plurality of products offered for sale via the Company Website 204. Thus, the Content Management System 210 may store product information pertaining to each of the plurality of products that may be purchased via the website. For example, the product information for a particular product may include a product title, product description, price, and/or one or more photographs illustrating the particular product.

Furthermore, each of the plurality of content options may pertain to a different one of a plurality of offers that may be provided to users. Thus, the Content Management System 210 may store offer information pertaining to each of the plurality of offers that may be provided via the website. For example, an offer may pertain to a particular product. As another example, an offer may provide a general benefit such as free shipping or a coupon worth a particular dollar amount or percentage.

In order to identify one or more content options to provide to the user 200, the Content Management System 210 may send a request for targeted content 212 to a machine learning system, Learning Decisioning System 214, implementing a machine learning technique (e.g., algorithm). For example, the Learning Decisioning System 214 may implement a machine learning technique such as Reinforcement Learning. Since the page request 206 may include information identifying the user, the information identifying the user may be further provided via the requests for content 208, 212. For example, the information identifying the user may include a Customer ID, which may be a cookie ID or some other unique customer identifier. The Learning Decisioning System 214 may use the Customer ID 216 to access the customer profile for the user in the customer profiles 218. Once customer profile information has been obtained from the customer profile, the Learning Decisioning System 214 may make a customer decision such as select appropriate targeted content for the user 200 based, at least in part, upon the customer profile information and a model, as will be described in further detail below. Upon identifying the appropriate targeted content for the user, the Learning Decisioning System 214 may send a content ID 220 identifying targeted content to the Content Management System 210. The Content Management System 210 may retrieve and send targeted content 222 identified by the content ID 220 via the Company Website 204, which provides a web page including the targeted content 224 via the computer 202 to the user 200.

In accordance with various embodiments, the Learning Decisioning System 214 may make a customer decision such as select appropriate targeted content for the user by applying a model to customer profile information retrieved from the user's customer profile. For example, through the use of a model, the Learning Decisioning System 214 may generate a score using customer profile information retrieved from the user's customer profile. A model may be implemented in many ways. For example, a model may be implemented via a set of mathematical equations including a plurality of variables, where each of the variables represents a different user feature such as age or gender. Each equation may correspond to a possible action that may be taken with respect to a user. A value for each of the variables representing user features may be retrieved for a particular user from the customer profile information for that user. In the mathematical equation, a weight may be associated with each of the plurality of variables. For example, a model may be represented by a mathematical equation such as $A_iX+B_iY+C_iZ=R_i$, where X represents feature 1 (e.g., age<=20), Y represents feature 2 (e.g., gender=F), and Z represents feature 3 (e.g., number of times the user has visited the website>=15 and <20), $A_i$, is a weight (i.e., multiplying factor) associated with variable X to score action i, $B_i$ is a weight associated with variable Y to score action i, $C_i$ is a weight associated with variable Z to score action i, and $R_i$ represents the numerical result determining the score of an action to be taken with respect to the user. Some mechanism may then be applied to determine which action to take from the various values of $R_i$. One possible method is simply to select the action $R_i$ with the largest score. Data values corresponding to user features may include binary values, numerical values and/or be represented via numerical values. More particularly, non-numerical data values for various user features may be represented via numerical or binary values. For example, a nominal variable may have each of a finite number of its possible values mapped to a binary value of 1 with any other value mapped to a binary value of 0. The generation of the model and corresponding weights may be determined through the use of customer profile information collected for a plurality of customers over time. In accordance with various embodiments, the model may be generated and updated through the use of binned data.

Once a customer decision for the user and an outcome of that decision has been identified, the customer decision and outcome may be recorded in the form of an update 226 to the customer profile for the user. For example, the outcome may include the user clicking on the targeted content, ignoring the targeted content, purchasing the product identified in the targeted content, or applying a special offer provided in the targeted content. In this example, recently obtained or updated raw customer profile data 228 from the user's customer profile may be provided to (or retrieved by) a Real-Time Adaptive Binner 230. More particularly, numerical values corresponding to each of a plurality of user features may be provided to the Real-Time Adaptive Binner 230. The Real-Time-Adaptive Binner 230 may update bin and/or partition boundaries 232 and bin the raw customer profile data 234 in a set of bins for each of one or more user features, as appropriate. More particularly, the Real-Time Adaptive Binner 230 may perform boundary and/or partition adjustment as raw customer profile data 234 is binned for each user feature (and corresponding variable).

In order to simplify the following description, the real-time adaptive binning for a single variable may be referred to as being performed by a Dynamic Binner. A Dynamic Binner may store data values observed over time for the variable in a corresponding set of bins. In addition, the Dynamic Binner may maintain a set of bin boundaries and/or bin partitions for the set of bins. Processes of performing real-time adaptive binning by a Dynamic Binner will be described in further detail below.

The Learning Decisioning System 214 may access binned customer profile data 236 from one or more bins for each of one or more variables to generate customer decisions for users. More particularly, the Learning Decisioning System 214 may periodically generate or update the model based, at least in part, upon the binned customer profile data 236. Since the binned customer profile data 236 indicates user responses to customer decisions, the Learning Decisioning System 214 may learn the best targeting content options to provide to various categories of users. Furthermore, through the generation of a model, the Learning Decisioning System 214 may generalize and predict user responses based upon previously binned data.

The functional blocks shown and described above with reference to FIG. 2 may be implemented via one or more servers. In addition, it is important to note that the functional blocks are merely illustrative. Therefore, the disclosed embodiments may be implemented in other contexts or systems.

FIGS. 3A-D are diagrams that together graphically illustrate a dynamic binning process in accordance with various embodiments. Each one of a plurality of customer variables may have associated therewith a different set of bins. Thus, adaptive binning may be performed separately for each set of bins. The dynamic binning process performed with respect to a single variable and corresponding set of bins will be described in further detail below.

In accordance with various embodiments, a set of bins may store data for a particular variable in a set of bins across a plurality of website events or other channel user events. A binning process may dynamically store and sub divide data values gathered for each of these events into a set of bins. Moreover, the binning process may bin data for a variable across multiple instances of a particular type of event (e.g., website visit). As one example, a variable may represent a feature such as age or gender of users across multiple instances of a particular event. Therefore, the binning process may store data associated with a plurality of users.

For example, a variable X may represent values for the user feature, age. Thus, each bin in the set of bins may store a different subset of data values (e.g., bin 1 may store values 0-19, bin 2 may store values 20-39, and bin 3 may store values 40-59). As another example, a variable Y may represent values for the user feature, gender.

Example events include, but are not limited to, the visiting of the customer website by a user, clicking on targeted content by a user, providing an offer to a user, and a purchase by a user of one or more products offered for sale via the website. For instance, each time a user visits the customer website, the age of the user may be obtained and added to the set of bins associated with the variable X, while the gender of the user may be obtained and added to another set of bins associated with the variable Y.

Other examples of variables for which data may be gathered across events such as those listed above include the number of times the customer has visited the website, the day of the week of the website visit, the day of the week of the last website visit by a customer, acceptance or rejection of an offer provided to the user, and the value of a purchase by the user of one or more products offered for sale via the website.

Figure 3A:
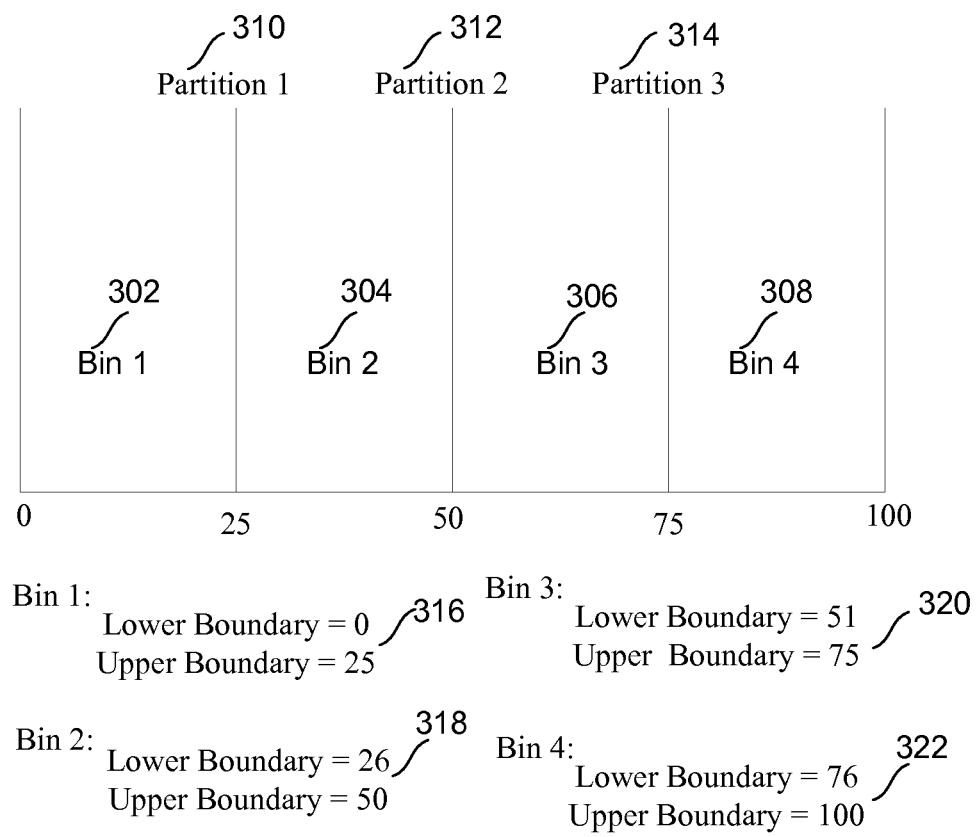
FIGS. 3A-D are diagrams that together graphically illustrate a simplified example of a dynamic binning process in accordance with various embodiments.

FIG. 3A is a diagram illustrating a simplified representation of a set of bins for a particular feature. The set of bins may be initialized such that a pre-defined number of bins is established for the feature. More particularly, the pre-defined number of bins may be an optimal number of bins designed with a goal of distributing the data values in some predefined distribution. This distribution may commonly be a uniform distribution, resulting in an approximately equal number of data values in each of the bins for the particular user feature. However, the distribution could include distributing data values such that each of the bins includes a different number of data values or percentage of the total number of data values in the set of bins. For example, the distribution could be an exponential, normal or any other distribution. Furthermore, the distribution of data values among the bins may be determined dynamically according to some external function or quantity, such as a measure of efficiency of the binning system. In this manner, an optimal distribution of bin populations among a set of bins may be determined.

In this example, the set of bins is initialized to include four bins, Bin 1 302, Bin 2 304, Bin 3 306, and Bin 4 308. As shown in this example, the bins 302-308 may be separated via a set of partitions. As shown in FIG. 3A, the bins 302-308 are separated via three partitions, Partition 1 310, Partition 2 312, and Partition 3 314. More particularly, Partition 1 310 separates Bin 1 302 and Bin 2 304, Partition 2 312 separates Bin 2 304 and Bin 3 306, and Partition 3 314 separates Bin 3 306 and Bin 4 308.

Binning is the process of storing data in one or more bins. In the following description, the term "bin" may be used to refer to a receptacle for storing data. However, it is important to note that the bins need not be implemented in separate data structures. Rather, in accordance with various embodiments, the one or more bins may be implemented via a single data structure such as a linear data structure.

The selection of a bin in which to store data may be based, at least in part, upon the value of the data, the partitions between the bins and/or the boundaries of each of the bins. More particularly, each bin may be defined by boundaries including a lower boundary and an upper boundary, which indicate the minimum and maximum data values, respectively, that may be stored in the corresponding bin. In addition, bins may be defined, at least in part, by the partitions between the bins. The range of data values between the lower and upper boundaries of a bin may be referred to as the "width" of the bin.

Binning is conventionally performed using bins that have an equal width, where the width is an optimal width chosen for the variable in advance. In this example, the set of bins corresponds to a variable representing the user feature age, which may be ascertained via a birthdate of a user obtained from a customer profile. In order to simplify this example, a range of possible data values of 0-100 is assumed. Thus, data values may be split into four bins having a width of 25.

The set of bins 302-308 may have a set of boundaries associated therewith, where the set of boundaries includes boundaries for each of the bins 302-308. A partition may correspond to an upper boundary of a first bin and/or a lower boundary of a second bin adjacent to the first bin. More particularly, where the data values consist of discrete values, the upper boundary of the first bin need not be identical to the lower boundary of the second bin, as shown in this example. However, where the data values correspond to a continuous variable, the partition may correspond to both the upper boundary of the first bin and the lower boundary of the second bin adjacent to the first bin.

In accordance with various embodiments, the data, the boundaries of the bins, and the partitions between the bins may include or correspond to numerical values. As set forth above, it is assumed in this example that the lowest user age may be 0 and the highest user age may be 100. Thus, the boundaries 316 for Bin 1 302 may include a Lower Boundary of 0 and an Upper Boundary of 25 (representing a range of 0-25), the boundaries 318 for Bin 2 304 may include a Lower Boundary of 26 and an Upper Boundary of 50 (representing a range of 26-50), the boundaries 320 for Bin 3 306 may include a Lower Boundary of 51 and an Upper Boundary of 75 (representing a range of 51-75), and the boundaries 322 for Bin 3 308 may include a Lower Boundary of 76 and an Upper Boundary of 100 (representing a range of 76-100).

Figure 3B:
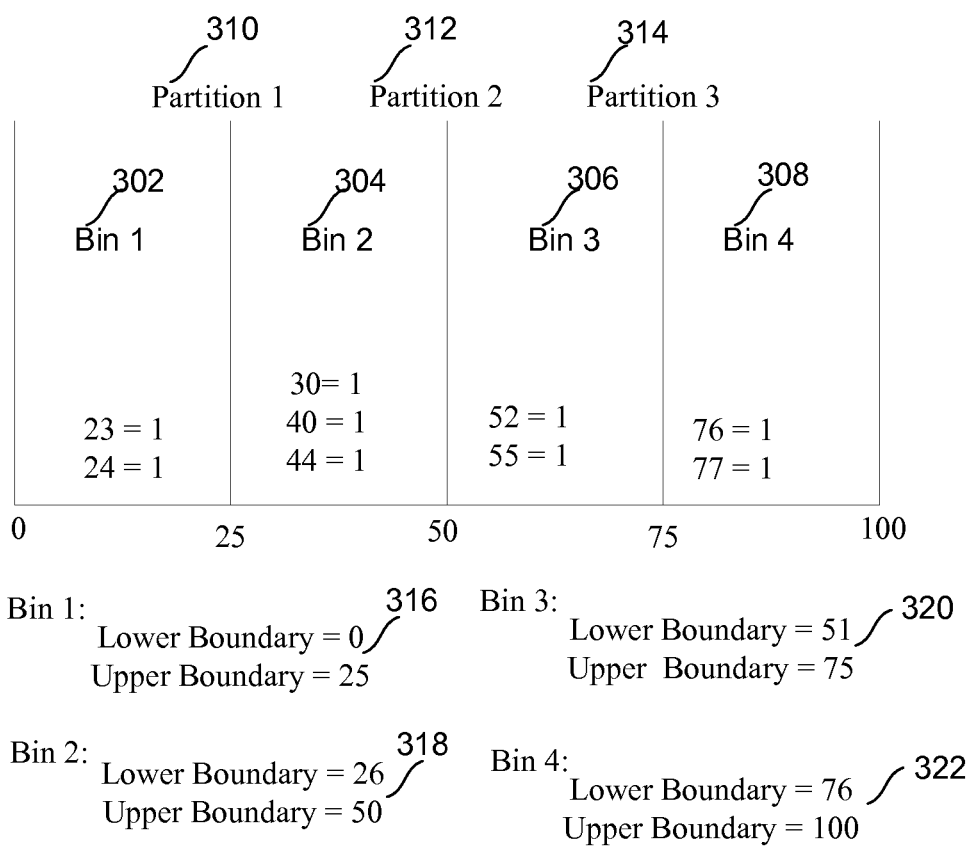

FIG. 3B illustrates the bins 302-308 after data values for nine different website user events have been stored in the bins 302-308. More particularly, Bin 1 302 includes one instance of each of data values 23 and 24, Bin 2 304 includes one instance of each of data values 30, 40, and 44, Bin 3 306 includes one instance of each of data values 52 and 55, and Bin 4 308 includes one instance of each of data values 76 and 77.

Figure 3C:
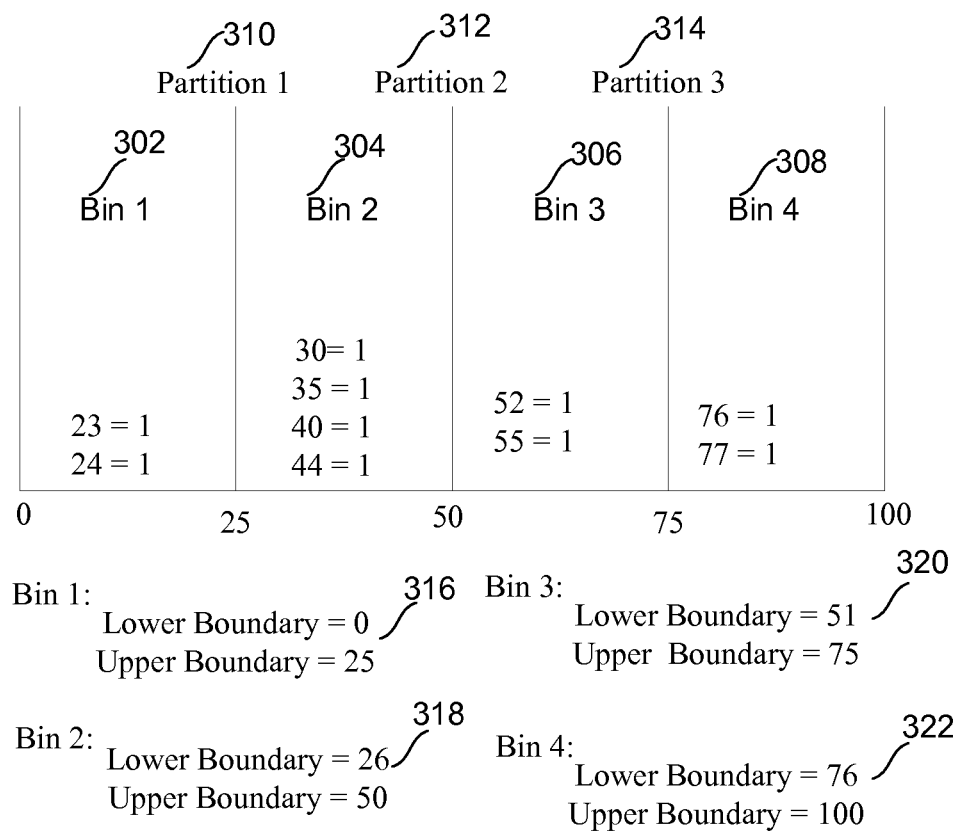

FIG. 3C illustrates the bins 302-308 after a tenth data value, 35, has been added to Bin 2 304. As shown in this example, one of the bins includes four data values while another one of the bins includes only two data values. As can be seen from this example, conventional binning processes often result in substantially different distribution of data values across the bins to that desired, in this example a uniform distribution 302-308.

One strategy that may be used is to distribute the data values (or data records representing the data values) as equally as possible (e.g., equally or approximately equally) across the bins, which may be referred to as an equal population binning strategy. Thus, the goal of an equal population binning strategy is to distribute the data values such that each of the bins includes the same percentage of the total data. For example, since the total number of data values in this example is equal to ten, the optimum number of data values per bin is 2.5.

It has traditionally been assumed that bin width is manually and statically configured to suit the variable for which the data is being processed and the application in which the data is being applied. However, for a machine learning system it becomes impractical to manually determine in advance the appropriate bin width for potentially thousands of variables. It would also be difficult to establish a default bin width that would generally apply to different variables and applications.

In an off-line model building case, applying an equal population binning strategy to establish equal (or approximately equal) population bins (or creating any other distribution over the bins) is relatively simple. More particularly, a first pass through an entire data set may be used to establish optimal bin boundaries. A second pass through the data set may be performed to bin the data, and a third pass through the data set may be performed to build a model using the binned data. However, the non-real-time nature of such a process would introduce step changes in the boundaries, which is less desirable for an on-line learning system than gradual change.

In order to build models that reflect current data, it is useful to build a model on-line incrementally as data is received, obtained, and/or processed. Unfortunately, establishing bin boundaries before there is adequate data to determine their optimal positions is a particularly difficult task. Furthermore, if a typical distribution of data values for a variable changes over time, the bin boundaries may no longer reflect this change. As a result, it is desirable to modify the set of bin boundaries and/or set of partitions to prevent the data from clumping together and moving away from the ideal population bins.

In accordance with various embodiments, adaptive binning may be performed by modifying a set of bin boundaries (e.g., adjusting one or more bin boundaries) to more closely approximate the optimum number of data values for each individual bin according to the desired distribution. Similarly, adaptive binning may be performed by modifying a set of partitions (e.g., adjusting one or more partitions). More particularly, through the use of real-time adaptive binning, the "sizes" of the bins and/or number of bins may be dynamically modified to adjust the amount of data being stored in each of the bins. In this manner, the number of data values per bin may be manipulated in real-time.

Binning may be performed in different ways for different types of variables. In accordance with various embodiments, initial bin boundaries may be established for a particular variable. This may simply be one bin with boundaries +infinity and −infinity, and as more data is added, additional bins and corresponding boundaries may be added. However, unlike conventional binning processes, the bin boundaries and/or partitions separating the bins may subsequently be dynamically modified as data is received, obtained, and/or processed. Therefore, the application of an equal population binning strategy will generally result in bins having different widths.

Figure 3D:
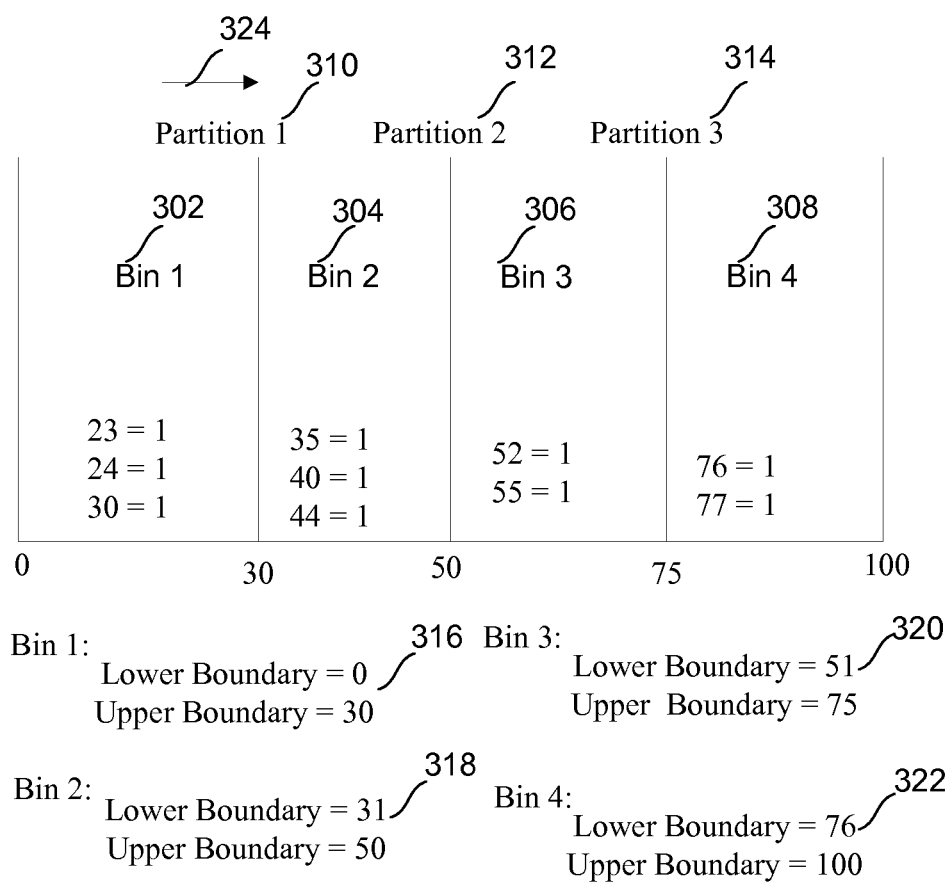

As shown in FIG. 3D, Partition 1 310 may be adjusted by sliding the Partition 1 310 to the right as shown 324. Adjusting the Partition 1 310 to the right results in increasing the value of the Partition 1 310. More particularly, the Partition 1 310 may be adjusted from a value of 25 to a value of 30. In contrast, if the Partition 1 310 were adjusted to the left, the value of the Partition 1 310 would decrease.

One or more boundaries of at least one of the bins may also be adjusted. Generally, adjustment of an upper boundary of a first bin will also involve an adjustment of a lower boundary of an adjacent second bin. In this example, the boundaries for Bin 1 302 may be modified as shown at 316. More particularly, the upper boundary of Bin 1 302 is increased to 30. Similarly, the boundaries for Bin 2 304 may be modified as shown at 318. More particularly, the lower boundary of Bin 2 304 is increased to 31. As a result of the adjustment of the boundaries as shown, data value 30 may be stored in Bin 1 302 rather than Bin 2 304. In other words, the number of data values in Bin 2 304 is reduced by one, while the number of data values in Bin 1 302 is increased by one. Accordingly, the number of data values in each of the bins of this particular set of bins more closely approximates the optimum values.

In accordance with various embodiments, at least one of the boundaries of at least one of the bins may be adjusted when the range of data values received over time changes. More particularly, a data value may be received that is outside the contiguous range of values represented by the set of bins. As a result, it may be desirable to modify the lower boundary of the first bin or the upper boundary of the last bin. In this example, as individuals who are older than 100 access the website, the upper boundary of Bin 4 may be increased. The increase of the upper boundary of Bin 4 results in the increase of the range of values represented by the set of bins. For example, the range of values represented by the set of bins may increase from 0-100 to 0-104. Accordingly, the lower and/or upper boundary of other bin(s) may be adjusted, as well, to more closely approximate the optimum number of data values per bin.

Although not shown in this example, it may be desirable to dynamically modify the number of bins in a set of bins associated with a particular variable (e.g., user feature). In accordance with one embodiment, the number of bins may be expanded or contracted up to a pre-defined desired number of bins. More particularly, the number of bins may be expanded or contracted based, at least in part, upon the number of unique data values in the set of bins and/or a minimum bin size indicating a minimum population of unique data values. For example, a new bin may be created when the count of the number of unique data values that will go into the new bin meets or exceeds a particular threshold value. Therefore, the number of bins may be increased by adding a bin to the set of bins or decreased by eliminating a bin from the set of bins.

Figure 4A:
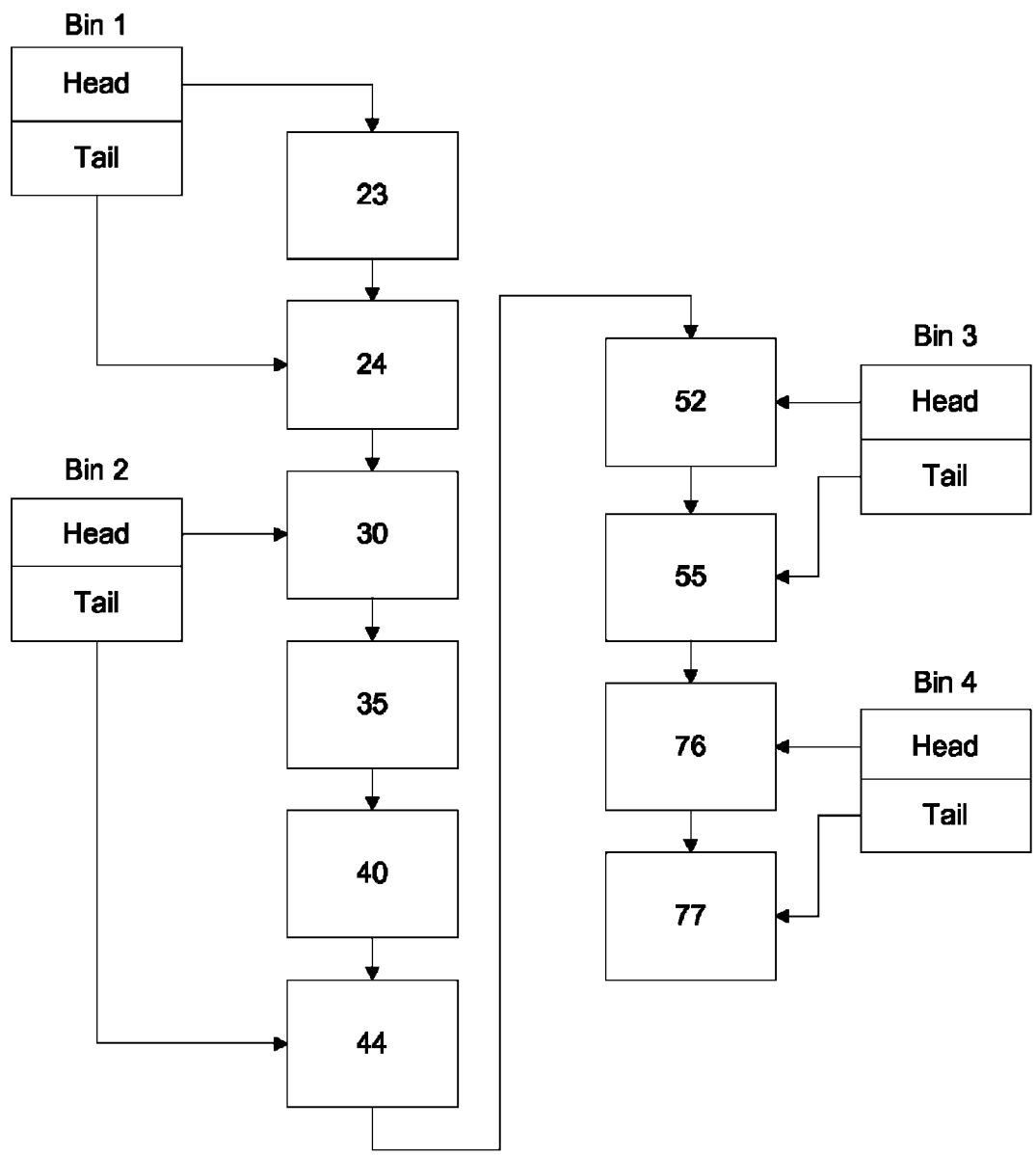
FIGS. 4A-4C are diagrams that together graphically illustrate an example implementation of a set of bins in accordance with various embodiments.

FIGS. 4A-4D are diagrams that together graphically illustrate an example implementation of a set of bins in accordance with various embodiments. In accordance with various embodiments, a set of bins may be implemented, at least in part, through the use of a linear data structure such as an array or linked list. For example, as shown in FIG. 4A, a plurality of bins may together store data within a single linear data structure such as a linked list of objects, where each of the bins stores data in a different segment of the linear data structure. The data values shown in the bins of FIG. 3D are replicated in FIG. 4A to illustrate the linear nature of a set of bins, enabling boundaries and/or partitions to be adjusted.

As shown in this example, each of the bins within a linear data structure such as a linked list may be identified via pointers such as a head pointer and a tail pointer. The boundaries of each of the bins may be represented via pointers and/or numerical values. Similarly, partitions may be represented via pointers and/or numerical values.

Figure 4B:
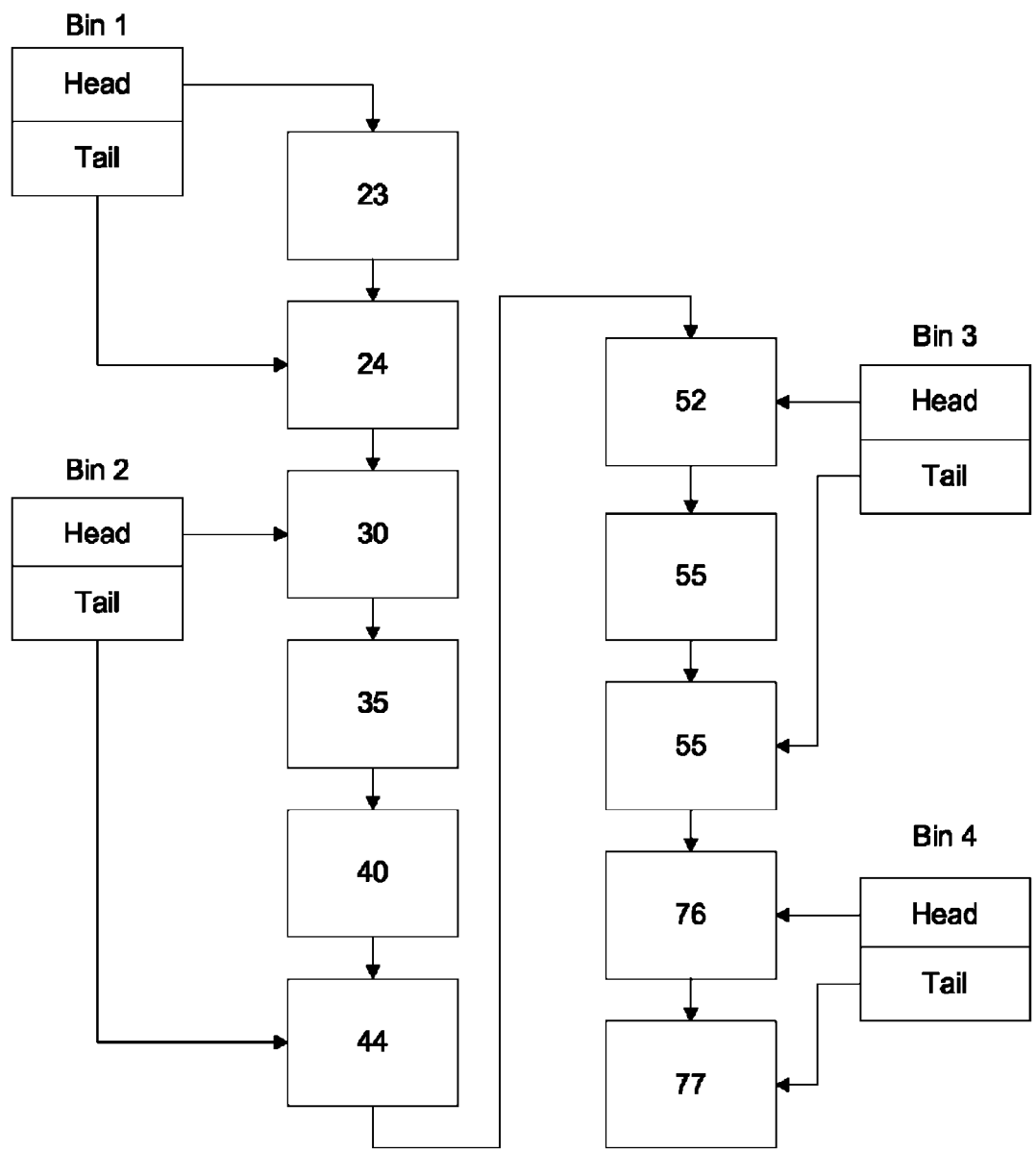

A data value may easily be added to one of the set of bins of FIG. 4A by instantiating an object and inserting the object at the appropriate point in the linked list. For example, a duplicate data value 55 may be inserted as shown in FIG. 4B. As shown in this example, data values such as numerical values may be added to the linked list such that the linked list includes numerical values in ascending or descending order. However, if multiple occurrences of the same data value are each represented by a separate data record (e.g., object), the multiple occurrences having the same data value may substantially increase the population of data values (or data records) in the corresponding bin. As a result, it may not be possible to allocate the same number of data values or records to each bin. Therefore, the introduction of duplicate data values further complicates the binning problem.

Figure 4C:
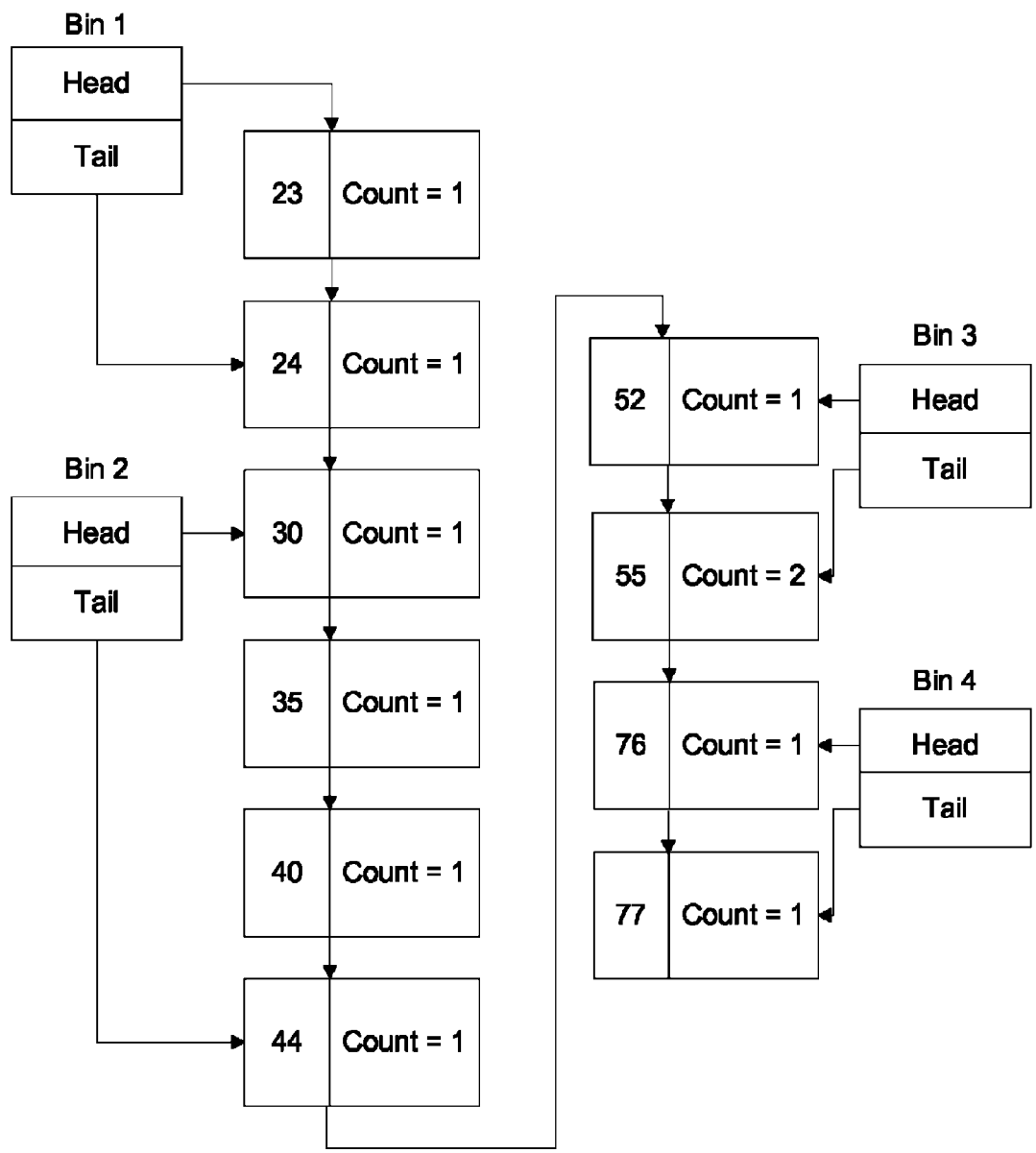

In accordance with various embodiments, in order to simplify the binning problem and minimize the memory consumed by the data values, unique data values may each have an associated count that indicates the number of instances of that unique data value. Thus, a single data record (e.g., object) may represent multiple occurrences of the same data value. In other words, each unique data value and its associated count may be represented by a corresponding single data record. This is shown in FIG. 4C, which illustrates a linked list of objects, where each of the objects identifies a unique data value and a corresponding count. Since a duplicate data value 55 was previously obtained and added to the pertinent bin, the count for the unique data value 55 may be increased to two without instantiating an additional object for the duplicate data value.

Data in any one of the bins may be obtained via traversing the corresponding linked list segment. For example, a bin may be accessed via a corresponding head pointer. The linked list segment may be traversed until the tail pointer is reached.

Although a set of bins is implemented via a linked list in this example, it is important to note that this example is merely illustrative. More particularly, a bin may be implemented via any number of data structures or portion thereof, as well as one or more types of data structures. Therefore, a set of bins may be represented via any number or types of data structures.

Adaptive Binning Through Boundary Adjustment

The disclosed embodiments enable bin boundaries to be automatically and dynamically modified in a dynamic real-time data environment. In accordance with various embodiments, adaptive binning may be performed to incrementally adjust boundary values as data values are obtained. More particularly, adaptive binning may be performed such that each bin in a set of bins for a particular variable is performed in accordance with a particular distribution. For example, adaptive binning may be performed such that each bin in the set of bins contains the same or approximately the same number of data values.

Figure 5A:
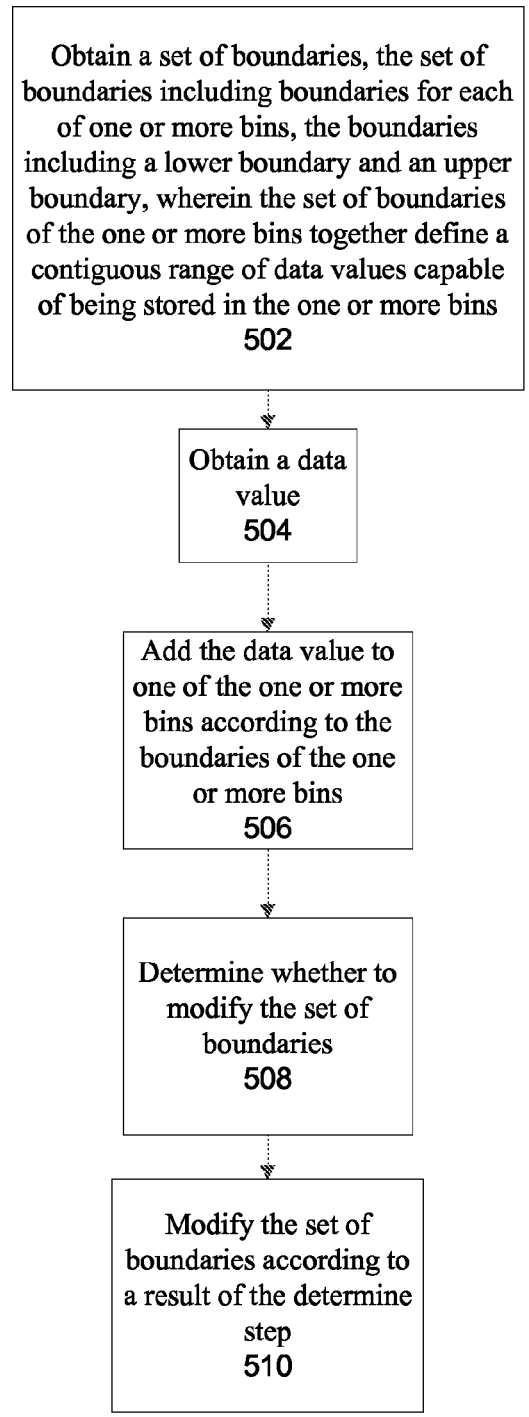
FIGS. 5A-5B are process flow diagrams that illustrate example methods of performing adaptive binning through boundary adjustment in accordance with various embodiments.
Figure 5B:
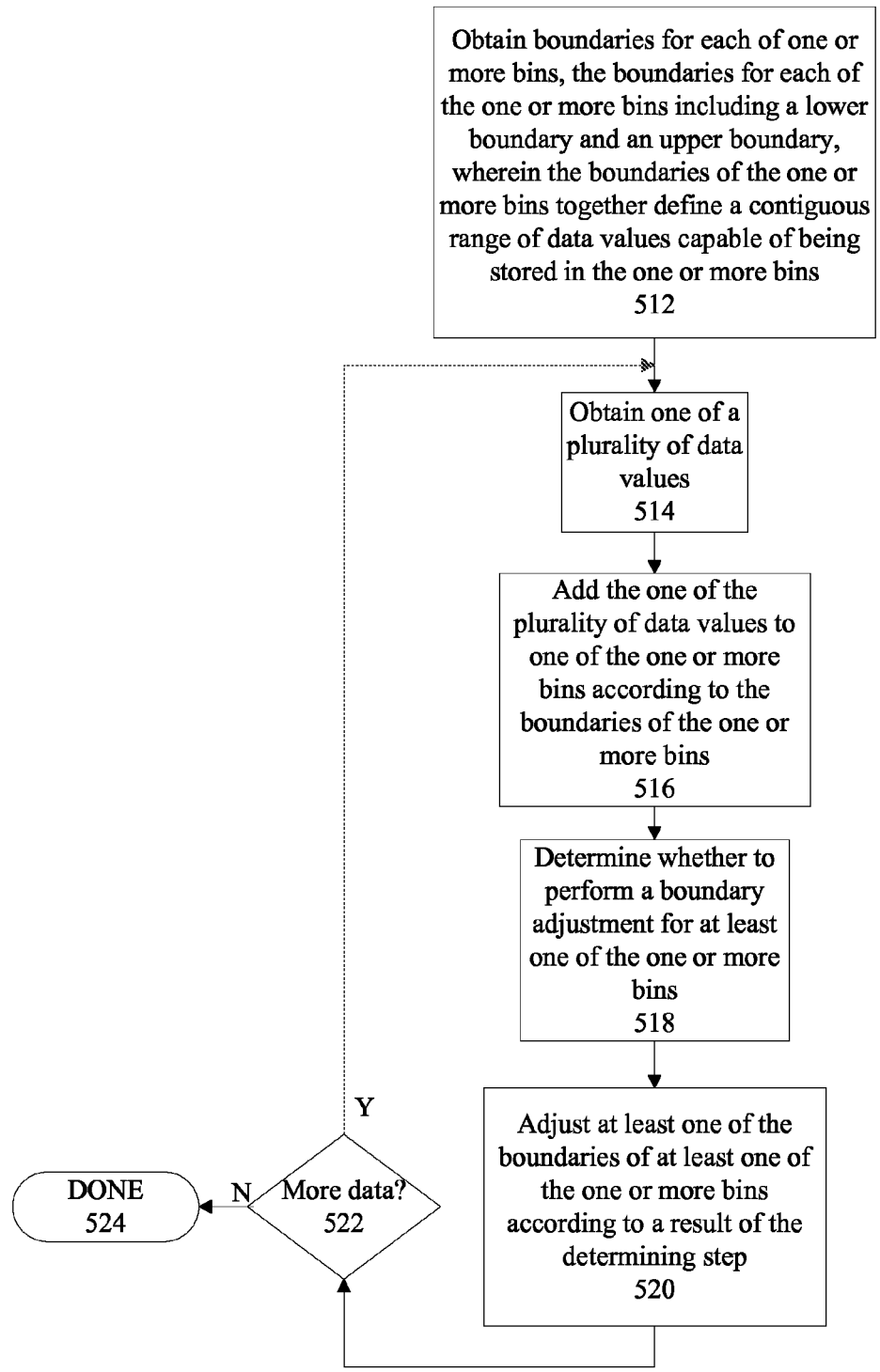

FIGS. 5A-5B are process flow diagrams that illustrate example methods of performing adaptive binning through boundary modification in accordance with various embodiments. FIG. 5A illustrates a method of performing adaptive binning. As shown at 502, a set of boundaries may be obtained, where the set of boundaries includes boundaries for each of one or more bins. More particularly, the one or more bins may correspond to a particular user feature such as age. The boundaries for each of the one or more bins may include a lower boundary and an upper boundary, where the set of boundaries of the one or more bins together define a contiguous range of data values capable of being stored in the one or more bins. For example, the boundaries and data values may include numerical values. Thus, the boundaries of each one of the one or more bins may define a different corresponding subset of the contiguous range of numerical values, wherein the subset of the contiguous range of numerical values is capable of being stored in the corresponding one of the one or more bins.

In accordance with various embodiments, the set of boundaries may be initialized such that the boundaries for each of the bins correspond to a particular minimum and maximum value. The set of boundaries may be pre-defined values, or may be dynamically generated values. In accordance with one embodiment, the initial set of bins may include a single bin with bounds +infinity and −infinity.

A data value may be obtained at 504. For example, the data value may correspond to a user feature such as age. The data value may be added to one of the one or more bins according to the boundaries of the one or more bins at 506. For example, where the data value is 26, the data value may be added to a bin having a lower boundary of 26 and an upper boundary of 50.

Boundary modification (e.g., adjustment) may then be performed. For example, boundary modification may be performed in response to the addition of a data value to one of the one or more bins. More particularly, it may be determined whether to modify the set of boundaries at 508. The determination of whether to modify the set of boundaries may result in a number of different determinations. More particularly, it may be determined that no modification of the set of boundaries (e.g., boundary adjustment) should be performed. In addition, it may be determined that one or more bin boundaries should be adjusted to increase a range of values represented by the set of bins, reduce the range of values represented by the set of bins, and/or reallocate data values among the set of bins. Moreover, it may be determined that one or more bin boundaries should be added (e.g., to add one or more bins) or eliminated (e.g., to eliminate one or more bins).

In accordance with various embodiments, it may be determined whether to perform a boundary adjustment for at least one of the one or more bins at 508. Thus, a population (e.g., number data values) in each of the one or more bins may be ascertained. The determination as to whether to perform a boundary adjustment may be made based, at least in part, upon an optimal population (e.g., number of data values) in each of the one or more bins and the ascertained population (e.g., number of data values) in each of the one or more bins.

The set of boundaries may be modified at 510 according to a result of the determining step. Modifying the set of boundaries according to the determination may include performing no boundary adjustment, adjusting (e.g., moving) one or more bin boundaries, reducing the number of bins (e.g., by eliminating one or more bin boundaries), and/or increasing the number of bins (e.g., by adding one or more bin boundaries). In accordance with various embodiments, at least one of the boundaries of at least one of the one or more bins may be adjusted according to a result of the determining step. Although boundary adjustment is represented in this example as steps 508-510, this example is merely illustrative.

In accordance with various embodiments, boundary modification (e.g., adjustment) may be an iterative process. Thus, multiple iterations of 508-510 may be performed to achieve the desired boundary adjustment. An example iterative process of performing boundary adjustment of 508-510 will be described in further detail with reference to FIG. 6.

Steps 504-510 may be performed for each of a plurality of data values corresponding to a particular feature, where the one or more bins are associated with the particular feature. For example, each of the plurality of data values may indicate the age of a user for a corresponding website user event.

In order to illustrate the iterative process of adaptive binning via boundary adjustment as data is received, an example method of performing adaptive binning for a plurality of data values is described with reference to FIG. 5B. Boundaries for each of one or more bins may be obtained at 512, where the boundaries for each of the one or more bins include a lower boundary and an upper boundary, and where the boundaries of the one or more bins together define a contiguous range of data values capable of being stored in the one or more bins.

Steps 514-520 may be performed for each one of a plurality of data values. More particularly, one of the plurality of data values may be obtained at 514. The one of the plurality of data values may be added to one of the one or more bins according to the boundaries of the one or more bins at 516. It may be determined whether to perform a boundary adjustment for at least one of the one or more bins at 518. More particularly, a population (e.g., number of data values) in each of the one or more bins may be ascertained. The determination as to whether to perform a boundary adjustment may be made based, at least in part, upon an optimal population (e.g., number of data values) in each of the one or more bins and the ascertained population (e.g., number of data values) in each of the one or more bins. At least one of the boundaries of at least one of the one or more bins may be adjusted according to a result of the determining step at 520. The process continues for remaining data at 522 until the process ends at 524.

In accordance with various embodiments, boundary adjustment may be an iterative process. Thus, multiple iterations of 518-520 may be performed to achieve the desired boundary adjustment. An example iterative process of performing boundary adjustment of 518-520 will be described in further detail with reference to FIG. 6.

In the examples set forth above with reference to FIGS. 5A-5B, boundary modification (e.g., adjustment) is performed as each data value is received. However, it is important to note that this example is merely illustrative. Therefore, boundary modification may be performed less frequently. For example, boundary modification may be performed after a pre-determined number of data values (e.g., two data values) have been received and binned. Furthermore, boundary modification may be performed periodically after a predetermined period of time has elapsed (e.g., 1 second) independent of the number of data values have been received.

It is important to note that the determination as to whether to modify a set of boundaries may be based upon calculations performed with respect to a subset of the set of boundaries. In other words, calculations need not be performed with respect to each boundary in the set of boundaries. For example, various methods of boundary modification may be performed with respect to internal boundaries separating the bins. Therefore, calculations need not be performed with respect to the lower boundary of the first bin in the set of bins or the upper boundary of the last bin in the set of bins. One example of performing boundary modification with respect to internal boundaries will be described below with reference to FIG. 6.

Figure 6:
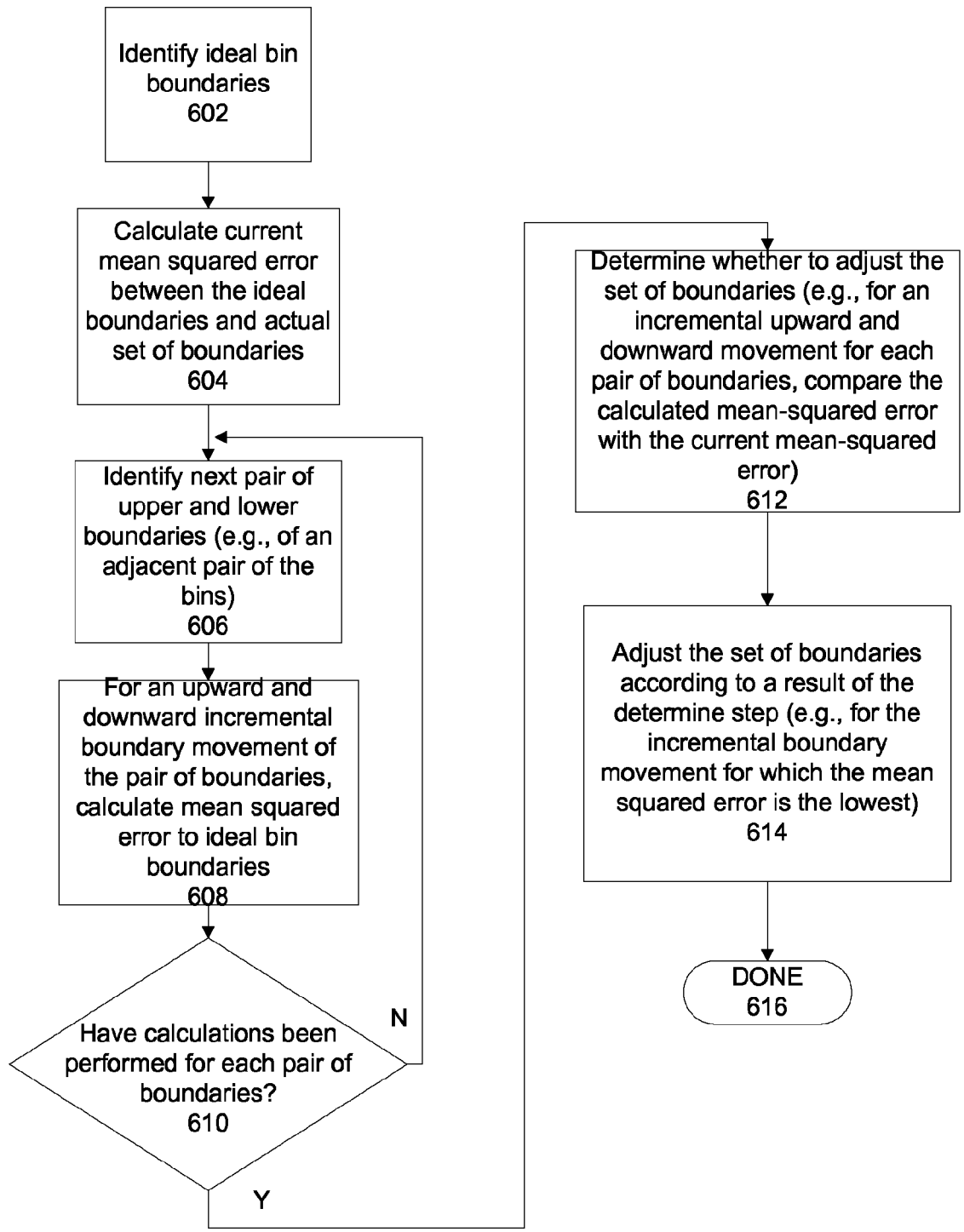
FIG. 6 is a process flow diagram illustrating an example method of adjusting boundaries in accordance with various embodiments.

FIG. 6 is a process flow diagram illustrating a method of adjusting bin boundaries in accordance with various embodiments. More particularly, the process described may operate to determine whether to perform a boundary adjustment and perform boundary adjustment in accordance with the determination, as described above with reference to blocks 508-510 and 518-520 of FIGS. 5A and 5B, respectively.

In accordance with various embodiments, bin boundary adjustment may be performed in accordance with a hill climbing algorithm. Through the use of a hill climbing algorithm to determine whether to perform a bin boundary adjustment, bin boundaries may be adjusted in a computationally efficient manner. More particularly, a hill climbing algorithm may be performed to minimize the mean squared error between an actual set of bin boundaries and an ideal set of bin boundaries.

An ideal set of bin boundaries may be ascertained based upon the concept of ideal bins and ideal bin masses. The term "bin mass" refers to the number of data values per bin (i.e., the size of the bin). Ideal bin masses for a set of bins may be defined for the uniform distribution case as the total number of data values divided by the total number of bins. Alternatively, where the distribution is a distribution other than uniform distribution, the ideal set of bin boundaries may be determined based upon ideal bin masses according to the distribution. In other words, the ideal bin masses for each bin in a set of bins need not include be identical. Typically, each data value is assumed to be a unique value for purposes of ascertaining an ideal set of bin boundaries.

The difficulty of applying a hill climbing algorithm to the data binning context is the presence of duplicate data values. For example, take the data $\{1, 1, 1, 1, 1, 2, 2, 3, 3\}$ which we wish to split into 3 bins. In the ideal case, since there are 9 data values, data would be split into 3 bins with respective masses $\{3, 3, 3\}$, i.e. with each of the bins including 3 data values. However, since a block of duplicate data values cannot be sub-divided, the best result that can be achieved is 3 bins with masses $\{5, 2, 2\}$. In the application of the hill climbing algorithm, the mean-squared error (MSE) is calculated between a vector of ideal masses according to the ideal set of bin boundaries and a vector of current masses according to the current boundaries of the set of one or more bins. In this example, MSE ($\{3, 3, 3\}, \{5, 2, 2\}$)=2. A description of hill climbing algorithms can be found in Russell, Stuart J.; Norvig, Peter (2003), *Artificial Intelligence: A Modern Approach* (2nd ed.), Upper Saddle River, N.J.: Prentice Hall, pp. 111-114, ISBN 0-13-790395-2, which is incorporated herein by reference for all purposes.

In accordance with various embodiments, in the application of a hill-climbing algorithm, each pair of upper and lower bin boundaries may be perturbed in turn, moving left and/or right, and the mean squared error may be calculated. The perturbation that results in the greatest reduction in mean-squared error may be selected and the pair of upper and lower boundaries may be adjusted accordingly (e.g., to implement the perturbation).

As shown in FIG. 6, ideal bin boundaries for the data values in the one or more bins may be identified at 602. As shown in this example, the current mean-squared error between the ideal set of bins (corresponding to ideal bin boundaries) and the actual set of bins (corresponding to actual bin boundaries) may be calculated at 604. More particularly, the mean-squared error between a vector of bin masses according to the current bin boundaries and a vector of bin masses according to the ideal bin boundaries may be calculated. The bin masses per bin may be ascertained, for example, by summing the counts within each respective bin.

For each pair of upper and lower boundaries (e.g., of an adjacent pair of the one or more bins), steps 606-608 may be performed. The next pair of upper and lower boundaries (e.g., of an adjacent pair of bins) may be identified at 606. In accordance with various embodiments, the pair of upper and lower boundaries may be the same (e.g., 25). Alternatively, the upper boundary of the pair of upper and lower boundaries may differ from the lower boundary of the pair of upper and lower boundaries. For example, the upper boundary may be 26 and the lower boundary may be 25. For an upward and a downward incremental boundary movement of the pair of upper and lower boundaries, the mean-squared error between a vector of bin masses according to the incremental boundary movement and a vector of bin masses according to the ideal boundaries may be calculated at 608.

It may then be determined whether calculations have been performed for each pair of upper and lower boundaries in the set of boundaries at 610. If calculations have not been performed for each pair of boundaries, the process continues at 606 for the next pair of boundaries.

When it is determined at 610 that calculations for each pair of boundaries have been performed, it may then be determined whether an adjustment of the set of boundaries according to an incremental upward or downward movement of a pair of upper and lower boundaries is appropriate at 612. More particularly, each mean-squared error calculated in step 608 (for an incremental upward and incremental downward movement for each pair of boundaries) is compared to the current mean-squared error calculated in step 604. If each mean-squared error calculated in step 608 is not less than the current mean-squared error calculated in step 604, then the set of boundaries need not be adjusted. In other words, the mean-squared between the actual bin boundaries and the ideal set of bin boundaries is already minimized. However, if any mean-squared error calculated in step 608 is less than the current mean-squared error calculated in step 604, then the mean-squared error between the actual bin boundaries and the ideal set of bin boundaries has not been minimized. In this case, it is determined that an incremental (upward or downward) movement of a pair of boundaries resulting in the lowest mean-squared error between the actual bin boundaries and the ideal set of bin boundaries is appropriate.

The set of boundaries may be adjusted at 614 according to a result of the determine step. More particularly, the set of boundaries may be adjusted and updated according to the incremental boundary movement found to minimize the mean-squared error between the actual bin boundaries and the ideal set of bin boundaries. The process ends at 616. In this manner, the mean-squared error between the actual bin boundaries and the ideal set of bin boundaries is minimized. Accordingly, at least one of the boundaries of at least one of the one or more bins may be adjusted such that the mean-squared error between the vector of ideal number of data values per bin and the vector of current number of data values per bin is minimized.

The example set forth above describes a method of performing boundary adjustment to reallocate data values among a set of bins. However, it is important to note that this example is merely illustrative. Therefore, boundary adjustment may be performed according to other processes, as well.

Adaptive Binning Through Partition Adjustment

Adaptive binning may also be accomplished via dynamic and automatic modification (e.g., adjustment) of partitions. More particularly, a set of partitions separating one or more bins for a particular variable may be stored (e.g., in the form of numerical values and/or pointers), where the set of partitions delineate the boundaries separating the one or more bins. Thus, the determination of whether to modify the set of boundaries may be accomplished by determining whether to modify the set of partitions. Similarly, modification of at least one of the boundaries of at least one of the one or more bins may be accomplished by modifying at least one of the set of partitions. More particularly, through the modification of a partition separating a first bin and a second bin, the upper boundary of the first bin and the lower boundary of the second bin may be modified implicitly.

The partition may correspond to both the upper boundary of the first bin and the lower boundary of the second bin. Alternatively, a relationship between partitions and the bordering boundaries may be pre-defined. For example, it may be assumed that the upper boundary of the first bin affected by the partition adjustment is equal to the partition, while the lower boundary affected by the partition adjustment is one greater than the partition.

Figure 7A:
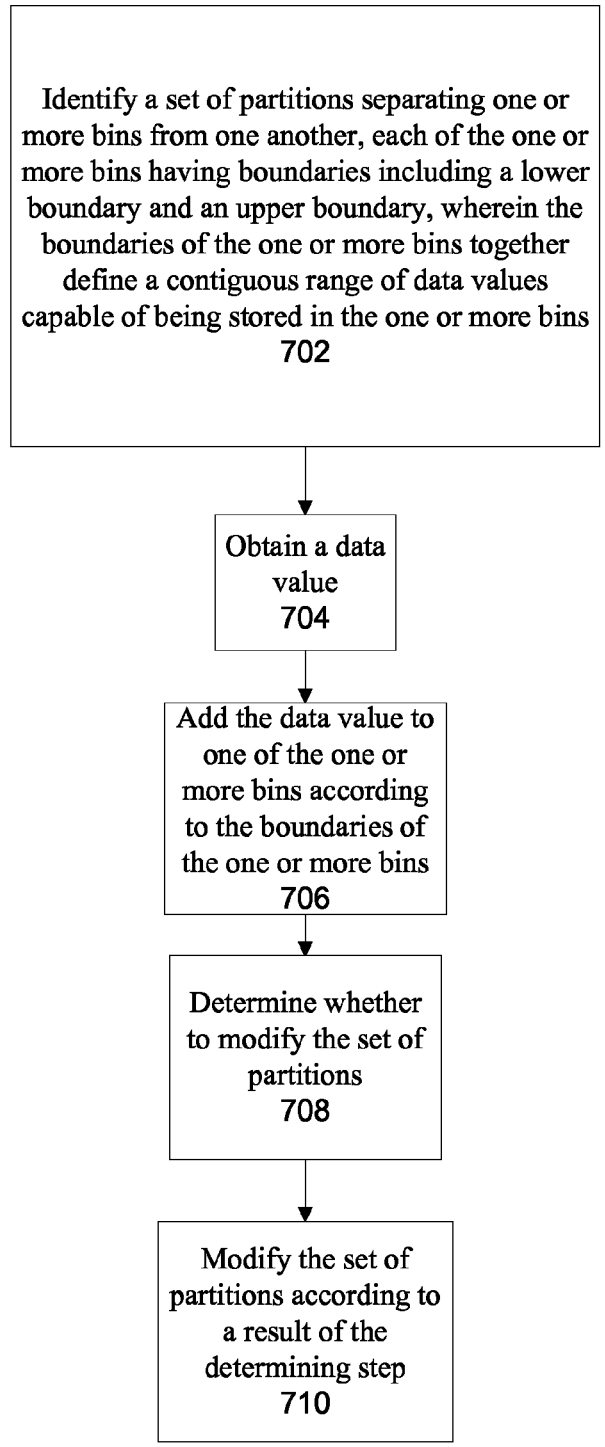
FIGS. 7A-7B are process flow diagrams that illustrate example methods of performing adaptive binning through adjustment of partitions in accordance with various embodiments.
Figure 7B:
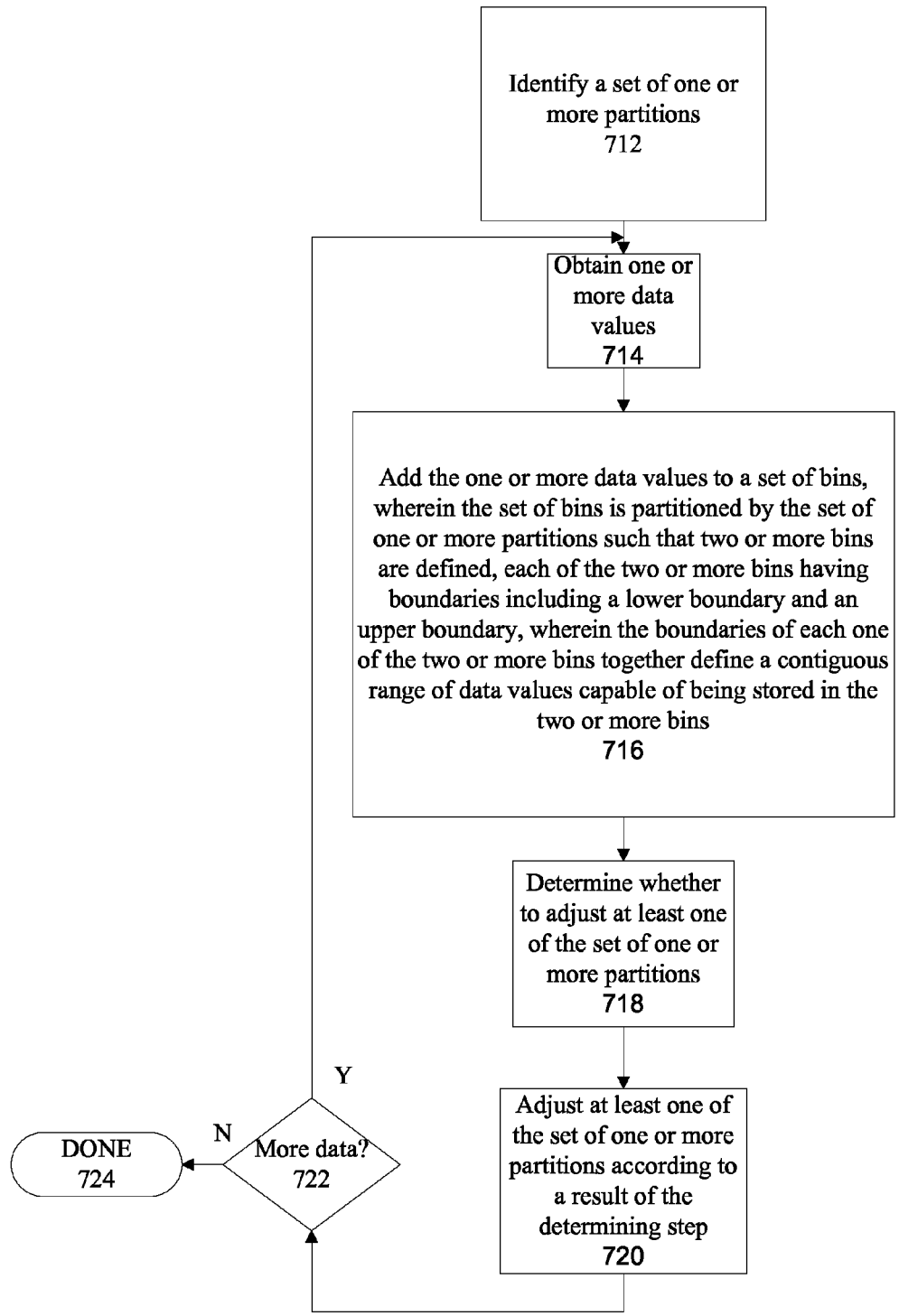

FIGS. 7A-7B are process flow diagrams that illustrate example methods of performing adaptive binning through modification of partitions in accordance with various embodiments. As shown in FIG. 7A, a set of partitions (e.g., zero or more partitions) separating one or more bins from one another may be identified at 702. For example, each of the set of partitions may be a value within a contiguous range of data values. Each of the one or more bins may be defined by boundaries including a lower boundary and an upper boundary, wherein the boundaries of the one or more bins together define a contiguous range of data values) capable of being stored in the one or more bins. Thus, the boundaries of each one of the one or more bins may define a different corresponding subset of the contiguous range of data values, wherein the subset of the contiguous range of data values is capable of being stored in the corresponding one of the one or more bins. A data value may be obtained at 704. The data value may be added to one of the one or more bins at 706 according to the boundaries of the one or more bins. It may be determined whether to modify the set of partitions at 708 (e.g., by adjusting at least one of the set of partitions). More particularly, the determination of whether to modify the set of partitions may result in a number of different determinations. It may be determined that no modification (e.g., adjustment) of the set of partitions should be performed. In addition, it may be determined that one or more partitions should be adjusted to reallocate data values among the set of bins. Moreover, it may be determined that one or more partitions should be added (e.g., to add one or more bins) or eliminated (e.g., to eliminate one or more bins).

In accordance with various embodiments, it may be determined whether to adjust at least one of the set of partitions. More particularly, a population (e.g., number of data values) in each of the one or more bins may be ascertained. The determination as to whether to adjust at least one of the set of partitions may be made based, at least in part, upon an optimal population (e.g., number of data values) in each of the one or more bins and the ascertained population (e.g., number of data values) in each of the one or more bins.

The set of partitions may be modified at 710 according to a result of the determining step. Modifying the set of partitions according to the determination may include performing no partition adjustment, adjusting (e.g., moving) one or more partitions, reducing the number of bins (e.g., by eliminating one or more partitions), and/or increasing the number of bins (e.g., by adding one or more partitions). In accordance with various embodiments, the set of partitions may be modified by adjusting at least one of the set of partitions.

FIG. 7B illustrates an example method of performing adaptive binning through adjustment of partitions separating bins of a set of bins. A set of one or more partitions may be identified at 712. For example, each of the set of one or more partitions may be a value within a contiguous range of data values. One or more data values may be obtained at 714. The one or more data values may be added one of the one or more bins at 716. The set of bins (and corresponding data structure(s)) may be partitioned by the set of one or more partitions such that one or more bins are defined, where each of the one or more bins has boundaries including a lower boundary and an upper boundary. The boundaries of the one or more bins may together define a contiguous range of data values (e.g., numerical values) capable of being stored in the one or more bins. Thus, the boundaries of each one of the one or more bins may define a different corresponding subset of the contiguous range of data values, wherein the subset of the contiguous range of data values is capable of being stored in the corresponding one of the one or more bins. It may be determined whether to adjust at least one of the set of one or more partitions at 718. More particularly, a population (e.g., number of data values) in each of the one or more bins may be ascertained. The determination as to whether to adjust at least one of the set of one or more partitions may be made based, at least in part, upon an optimal population (e.g., number of data values) in each of the one or more bins and the ascertained population (e.g., number of data values) in each of the one or more bins. At least one of the set of one or more partitions may be adjusted at 720 according to a result of the determining step. The process continues for remaining data at 722 until the process ends at 724.

In the examples set forth above with reference to FIGS. 7A-7B, partition modification (e.g., adjustment) is performed as each data value is received. However, it is important to note that this example is merely illustrative. Therefore, partition modification may be performed less frequently. For example, partition modification may be performed after a pre-determined number of data values (e.g., two data values) have been received and binned. Furthermore, partition modification may be performed periodically after a predetermined period of time has elapsed (e.g., 1 second) independent of the number of data values that have been received.

Figure 8:
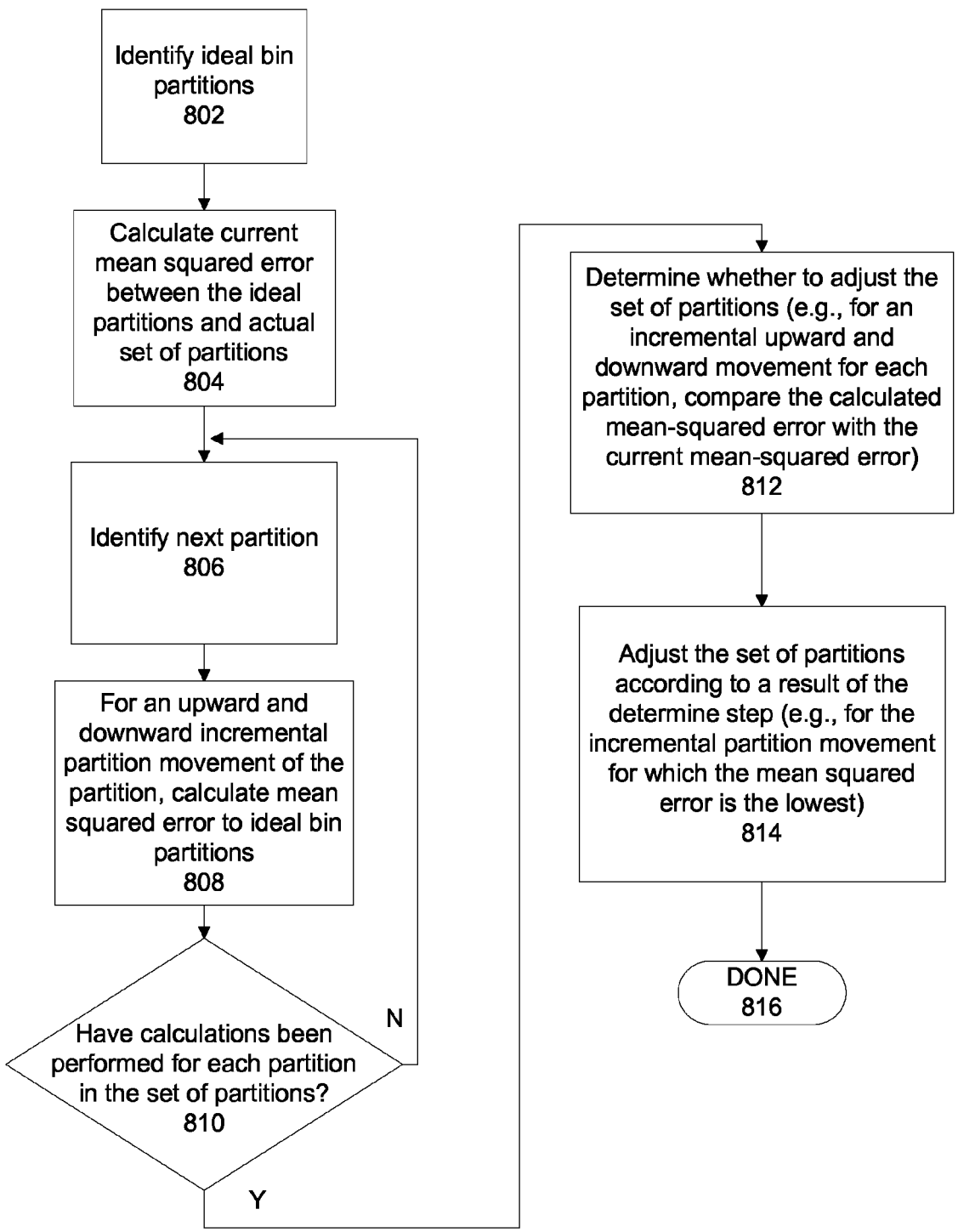
FIG. 8 is a process flow diagram illustrating an example method of adjusting partitions in accordance with various embodiments.

FIG. 8 is a process flow diagram illustrating an example method of adjusting partitions in accordance with various embodiments. More particularly, the process described may operate to determine whether to perform a partition adjustment and perform partition adjustment in accordance with the determination, as described above with reference to blocks 708-710 and 718-720 of FIGS. 7A and 7B, respectively.

In accordance with various embodiments, partition adjustment may be performed in accordance with a hill climbing algorithm. More particularly, as set forth above, a hill climbing algorithm may be implemented to minimize the mean-squared error between the current bins corresponding to actual bin partitions and ideal bins corresponding to ideal bin partitions.

As shown in FIG. 8, ideal bin partitions for the data values in the one or more bins may be identified at 802. As shown in this example, the current mean-squared error between the ideal set of bins (corresponding to ideal bin partitions) and the actual set of bins (corresponding to actual bin partitions) may be calculated at 804. More particularly, the mean-squared error between a vector of bin masses according to the current bin partitions and a vector of bin masses according to the ideal bin partitions may be calculated. The bin masses per bin may be ascertained, for example, by summing the counts within each respective bin.

For each partition in the set of partitions, steps 806-808 may be performed. The next partition may be identified at 806. For an upward and a downward incremental movement of the partition, the mean-squared error between a vector of bin masses according to the incremental partition movement and a vector of bin masses according to the ideal partitions may be calculated at 808.

It may then be determined whether calculations have been performed for each partition in the set of partitions at 810. If calculations have not been performed for each partition, the process continues at 806 for the next partition.

When it is determined at 810 that calculations for each partition have been performed, it may then be determined whether an adjustment of the set of partitions according to an incremental upward or downward movement of a partition is appropriate at 812. More particularly, each mean-squared error calculated in step 808 (for an incremental upward and incremental downward movement for each partition) is compared to the current mean-squared error calculated in step 804. If each mean-squared error calculated in step 608 is not less than the current mean-squared error calculated in step 804, then the set of partitions need not be adjusted. In other words, the mean-squared between the actual bin partitions and the ideal set of bin partitions is already minimized. However, if any mean-squared error calculated in step 808 is less than the current mean-squared error calculated in step 804, then the mean-squared error between the actual bin partitions and the ideal set of bin partitions has not been minimized. In this case, it is determined that an incremental (upward or downward) movement of a partition resulting in the lowest mean-squared error between the actual bin partitions and the ideal set of bin partitions is appropriate.

The set of partitions may be adjusted at 814 according to a result of the determine step. More particularly, the set of partitions may be adjusted and updated according to the incremental partition movement found to minimize the mean-squared error between the actual bin partitions and the ideal set of bin partitions. The process ends at 816. In this manner, the mean-squared error between the actual bin partitions and the ideal set of bin partitions is minimized. Accordingly, at least one of the partitions of at least one of the one or more bins may be adjusted such that the mean-squared error between the vector of ideal number of data values per bin and the vector of current number of data values per bin is minimized.

The example set forth above describes a method of performing partition adjustment to reallocate data values among a set of bins. However, it is important to note that this example is merely illustrative. Therefore, partition adjustment may be performed according to other processes, as well.

Although the modification (e.g., adjustment) of partitions is described separately from the modification (e.g., adjustment) of bin boundaries, it may be desirable to modify (e.g., adjust) one or more bin boundaries, as well as one or more partitions. For example, the bin boundaries impacted by an adjustment of one or more partitions may be adjusted accordingly. As another example, an increase of a range of data values received by the website over time may involve the decrease of the bin boundary representing the lowest data value in the range and/or the increase of the bin boundary representing the highest data value in the range. Similarly, a decrease in the range of data values received by the website over time may involve the increase of the bin boundary representing the lowest value in the range and/or the decrease of the bin boundary representing the highest data value in the range.

In accordance with various embodiments, the performance of real-time adaptive binning may be performed through the modification (e.g., adjustment) of partitions and/or the modification (e.g., adjustment) of bin boundaries. More particularly, it may be determined whether to modify a set of partitions and/or a set of boundaries. The set of partitions and/or the set of boundaries may be modified according to a result of the determination, as discussed above. Thus, the disclosed embodiments may be used in combination with one another to achieve optimal results.

Binning of Data Values

Data values that are binned may be represented through the use of a variety of data structures. However, by maintaining separate data records for duplicate data values, the memory consumed by the data values may increase substantially in a short period of time. In accordance with various embodiments, data values may be stored in bins for a particular variable through maintaining a set of counts for unique data values for that variable. More particularly, the set of counts for a particular variable may include a count for each unique data value in a plurality of data values for the variable, where the count indicates a number of times the unique data value occurs in the plurality of data values. Accordingly, through the use of counts, duplicate data values may be stored such that memory utilization is minimized.

In accordance with various embodiments, in order to add a data value to one of the bins, it may be determined whether a count for the data value exists in the set of counts. The count for the data value may be incremented or generated according to a result of the determination. For example, if it is determined that a count does not exist for the data value, the count for the data value may be generated and initialized to an initial value of one. However, if a count for the data value exists, the count for the data value may be incremented.

It may be determined whether a count exists for a data value based upon a determination of whether a data record (e.g., object) exists for the data value. More particularly, a new data record (e.g., object) may be generated for each unique data value (e.g., where a linked list is implemented) that has been added to the set of bins. Each data record may include a count for the corresponding data value. Thus, in order to add a data value to one of the bins, it may be determined whether a data record (and therefore a count) for the data value exists. The count for the data value may be incremented or generated (along with a new data record) according to a result of the determination. For example, if it is determined that a data record does not exist for the data value, a data record (including a count) for the data value may be generated (e.g., via instantiation of an object) and the count may be initialized to an initial value of one. However, if a data record for the data value exists, the count for the data value may be incremented.

A plurality of data values may be collected over time and binned in one or more sets of bins. Furthermore, the plurality of data values may be maintained in the sets of bins over a significant period of time. Thus, depreciation of data values in the sets of bins may be performed to ensure that the most recent data is weighted more heavily. Various methods of depreciation will be described in further detail below.

As the amount of data stored in bins increases, the amount of memory consumed may increase rapidly. As a result, it may be desirable to compress data in one or more of the bins to reduce the amount of memory consumed. Various methods of compression of data will be described in further detail below.

Compression of Data Values

Some variables will contain a high proportion of unique data values. For example, a variable representing timestamps of website visits by customers would typically include a large number of unique data values. A result, the memory consumed by data values for such variables will generally increase substantially over time In accordance with various embodiments, two or more data values may be compressed to minimize memory utilization. More particularly, the data values or subset of data values in a particular bin may be compressed. This may be accomplished by merging at least a subset of the plurality of data values within one of the bins to a single merged data value. In addition, the count for each of the subset of the plurality of data values may be merged to a single count corresponding to the single merged data value.

Figure 9:
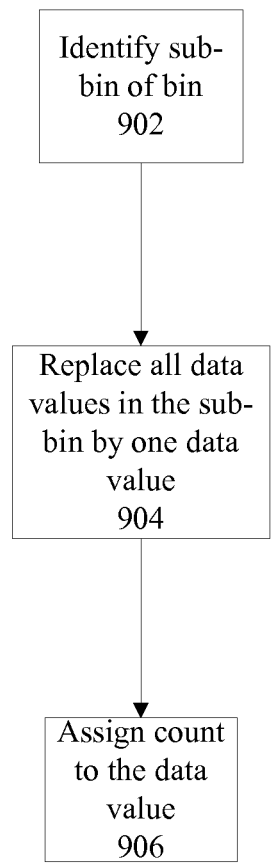
FIG. 9 is a process flow diagram illustrating an example method of compressing data values in accordance with various embodiments.

A subset of data values in a particular bin may be referred to as a sub-bin. FIG. 9 is a process flow diagram illustrating an example method of compressing data values within a sub-bin. As shown in FIG. 9, a sub-bin including two or more data values may be identified or selected at 902. The data values in the sub-bin may be replaced by a single data value at 904. For example, the average or the mean of the data values in the sub-bin may be obtained to generate the single data value. In addition, a count may be associated with the single data value at 906. More particularly, the count assigned to each of the data values in the sub-bin may be merged into a single count. For example, the single count may equal the sum of the counts associated with the data values in the sub-bin. In this manner, unique data values within a sub-bin may be merged to one value which may be, for example, the average or mass-weighted mean of all values in the sub-bin, with mass equal to the sum of all masses in the sub-bin.

Compression of data values within one or more sub-bins may be performed for each bin in a set of bins until the number of unique data values in each bin is reduced below a pre-defined threshold. Thus, the pre-defined threshold may specify a maximum number of unique data values per bin. In accordance with various embodiments, a bin may be subdivided into a number of sub-bins equal to the pre-defined threshold. Compression of the data values within each of the sub-bins per bin may be performed as set forth above with reference to FIG. 9.

Compression for each bin in a set of bins may be performed in parallel (e.g., via a separate Dynamic Binner for each bin, each controlling the boundaries/partitions of the sub-bins). Alternatively, compression for each bin may be performed sequentially (e.g., via a single Dynamic Binner, sequentially determining the boundaries/partitions of the sub-bins).

Compression for a bin may be initiated when a Dynamic Binner has detected that the number of unique data values in the bin has exceeded the corresponding pre-defined threshold. Alternatively, compression of the data values for all bins in a set of bins may be performed periodically. For example, compression may be performed after X data values have been added to a set of bins. As another example, compression may be performed every n time units (e.g., milliseconds).

Depreciation of Data Values

Since data values may be collected and stored over a significant amount of time, bin boundaries and/or partitions modified based upon the data values may not reflect recent trends for the data values. Therefore, it would be beneficial if bin boundaries and/or partitions could be modified solely based upon recent data values.

In accordance with various embodiments, data values in a set of bins for a particular variable may be depreciated over time. This ensures that data is gradually "forgotten" after it has been stored for a significant period of time.

Depreciation of the data values may be performed periodically. For example, data values in a set of bins may be depreciated each time a data value is added to a bin in the set of bins. As another example, data values in the set of bins may be depreciated every n time units (e.g., milliseconds).

Depreciation of data values may be accomplished, for example, by depreciating the count for each unique data value in the respective bins. This may be accomplished through a variety of mechanisms. For example, the count for each unique data value may be decremented periodically. As another example, an exponential function that is a function of time may be applied to each count in one or more sets of bins. An example equation that may be applied is as follows:

$$\text{count} \leftarrow \text{count} * \text{depreciationfactor}^n$$

where n is the number of time units since the last depreciation. The depreciation factor, depreciationfactor, may be a numerical value that is between zero and one. In this manner, more recent data may be weighted more heavily than older data.

Alternatively, each one of the plurality of data values may have a timestamp associated therewith, where the time indicates when the corresponding one of the plurality of values was obtained. One or more of the plurality of data values may be deleted from the set of bins based, at least in part, upon the timestamps associated with the data values. For example, a traveling window may be applied to a plurality of data values stored in a set of bins such that older data values are replaced with newer data values.

The adaptive binning processes described herein may be used separately or in combination to perform the adaptive binning of data in a set of bins for a particular user feature such as age. Moreover, the adaptive binning processes may be performed sequentially or in parallel for multiple user features, where each of the user features corresponds to a different set of bins. For example, an adaptive binning process may be performed with respect to various user features such as number of website visits per user, number of products purchased via the website per user, zip code, age, gender, etc. These adaptive binning processes may include compression of data values and/or depreciation of data values.

In accordance with various embodiments, a model may be generated or updated based, at least in part, upon a set of data values in at least one of the one or more bins in one or more sets of bins. Moreover, a data model may be generated based, at least in part, upon data values in two or more sets of bins. In addition, the boundaries/partitions for a set of bins corresponding to one variable may depend, at least in part, upon the boundaries/partitions for another set of bins corresponding to another variable. More particularly, boundary/partition modification for a set of bins for one variable may be performed simultaneously with boundary/partition modification for another set of bins for another variable. This may be accomplished, for example, through the generation of a grid in which data values may be stored for both variables.

The model may be applied to generate customer decisions for users who are customers of a particular website. For example, the model may be applied to identify content to serve the users. Upon applying customer decisions to users, customer profiles may be updated immediately to record the customer decisions. Similarly, customer profiles may be updated with customer responses as the responses are detected. Since adaptive binning of data may be performed in real-time as the data is received or obtained, the model may be incrementally updated in real-time. As a result, customer decisions generated via the model may be made based upon the most recent data available. Accordingly, real-time adaptive binning may be advantageously implemented to increase click-through rates or otherwise optimize a website or other channel.

Figure 10:
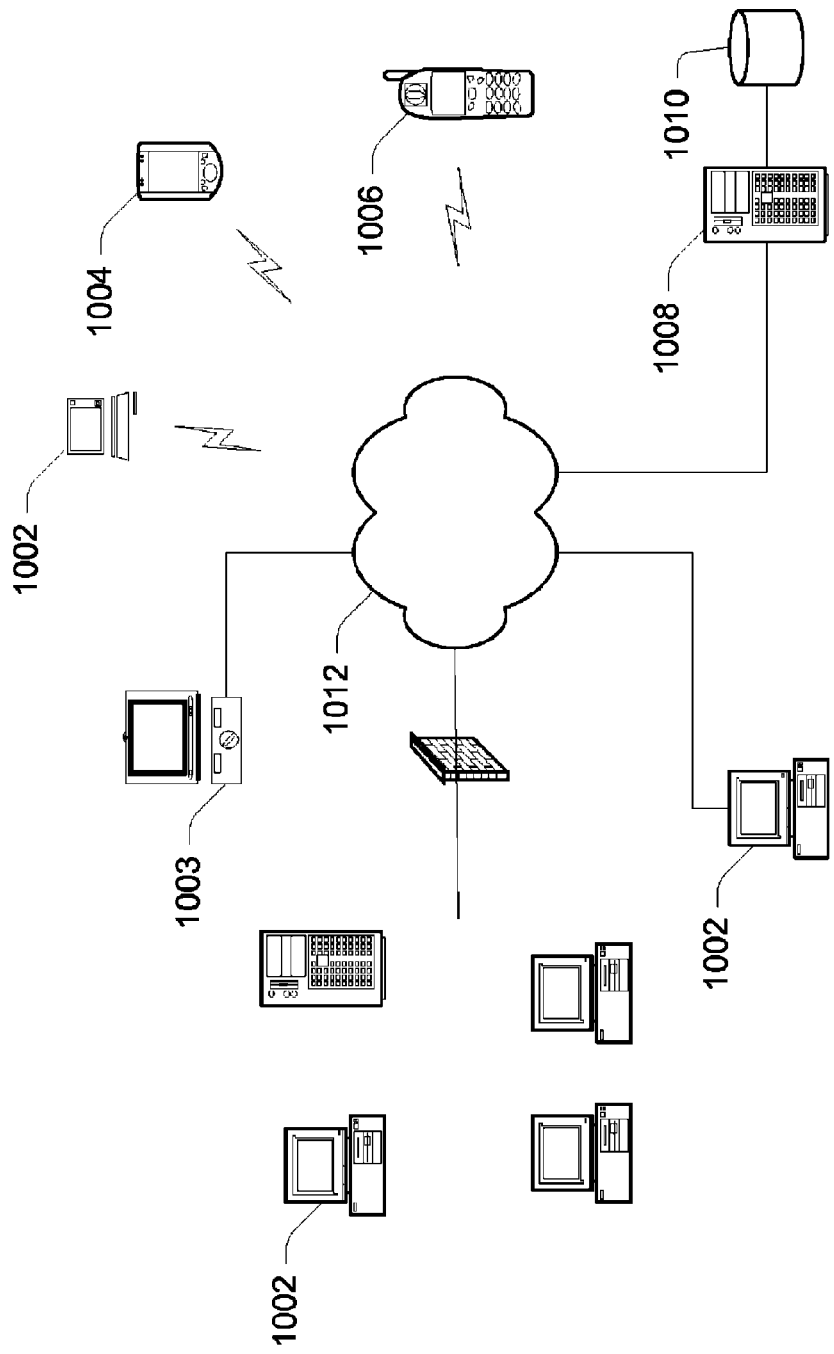
FIG. 10 is a diagram illustrating an example system in which various embodiments may be implemented.

Embodiments of the present invention may be employed in any of a wide variety of computing contexts. For example, as illustrated in FIG. 10, implementations are contemplated in which the relevant population of users interact with a diverse network environment via any type of computer (e.g., desktop, laptop, tablet, etc.) 1002, media computing platforms 1003 (e.g., cable and satellite set top boxes and digital video recorders), handheld computing devices (e.g., PDAs) 1004, cell phones 1006, or any other type of computing or communication platform.

Adaptive binning may be performed according to the invention in some centralized manner. This is represented in FIG. 10 by server 1008 and data store 1010 which, as will be understood, may correspond to multiple distributed devices and data stores. The invention may also be practiced in a wide variety of network environments (represented by network 1012) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The program instructions may be implemented in an object-oriented language such as C++ or Java. The memory or memories may also be configured to store one or more sets of bins, data values, customer profiles, product information, computer-readable instructions for performing the disclosed methods as described herein, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 11:
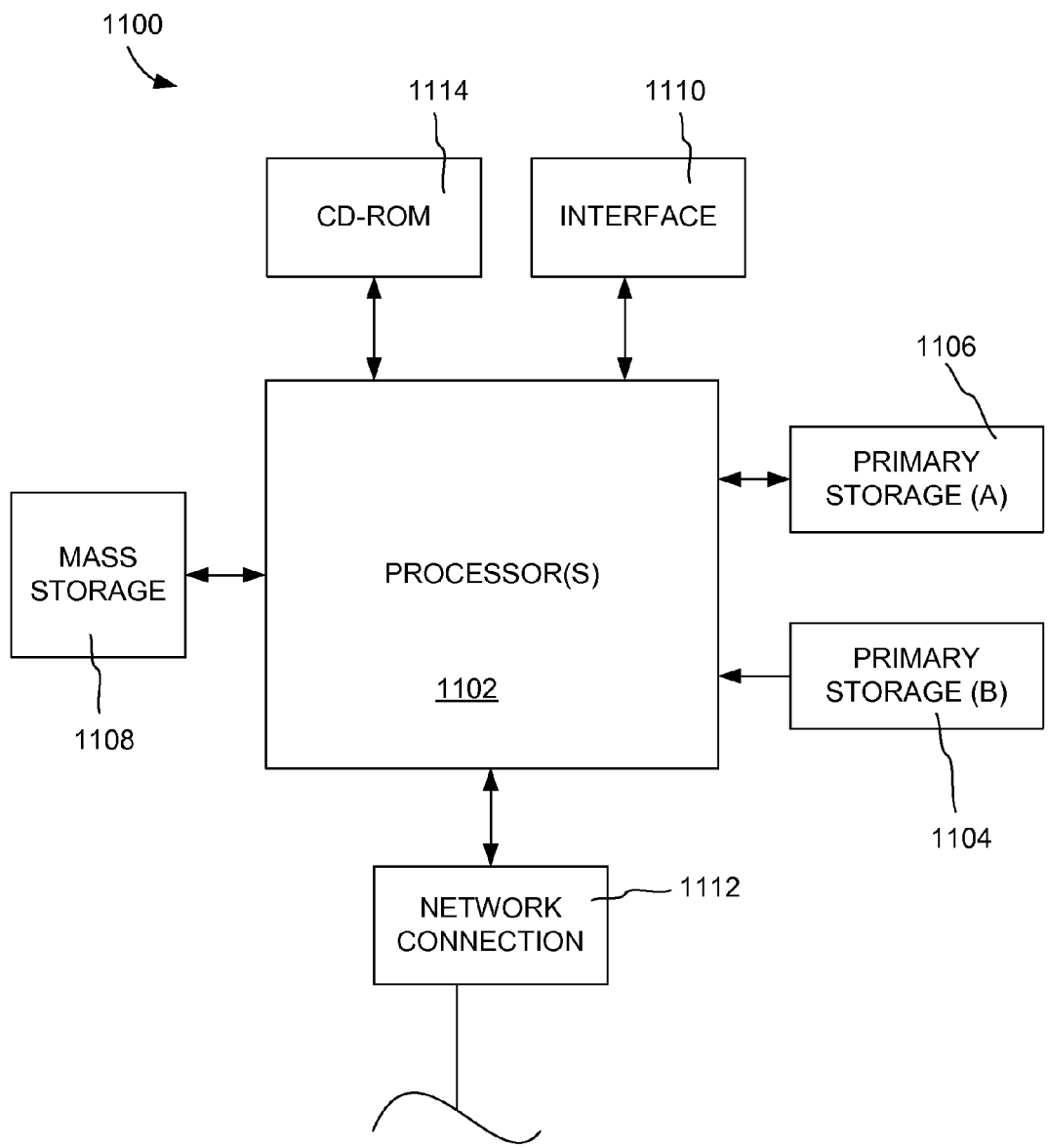
FIG. 11 illustrates an example computer system via which various embodiments may be implemented.

FIG. 11 illustrates a typical computer system that, when appropriately configured or designed, can serve as a system of this invention. The computer system 1100 includes any number of processors 1102 (also referred to as central processing units, or CPUs) that are coupled to storage devices including primary storage 1106 (typically a random access memory, or RAM), primary storage 1104 (typically a read only memory, or ROM). CPU 1102 may be of various types including microcontrollers and microprocessors such as programmable devices (e.g., CPLDs and FPGAs) and unprogrammable devices such as gate array ASICs or general purpose microprocessors. As is well known in the art, primary storage 1104 acts to transfer data and instructions uni-directionally to the CPU and primary storage 1106 is used typically to transfer data and instructions in a bi-directional manner. Both of these primary storage devices may include any suitable computer-readable media such as those described above. A mass storage device 1108 is also coupled bi-directionally to CPU 1102 and provides additional data storage capacity and may include any of the computer-readable media described above. Mass storage device 1108 may be used to store programs, data and the like and is typically a secondary storage medium such as a hard disk. It will be appreciated that the information retained within the mass storage device 1108, may, in appropriate cases, be incorporated in standard fashion as part of primary storage 1106 as virtual memory. A specific mass storage device such as a CD-ROM 1114 may also pass data uni-directionally to the CPU.

CPU 1102 may also be coupled to one or more interfaces 1110 that connect to one or more input/output devices such as such as video monitors, track balls, mice, keyboards, microphones, touch-sensitive displays, transducer card readers, magnetic or paper tape readers, tablets, styluses, voice or handwriting recognizers, speakers, or other well-known input devices such as, of course, other computers. Finally, CPU 1102 optionally may be coupled to an external device such as a database or a computer or telecommunications network using an external connection as shown generally at 1112. With such a connection, it is contemplated that the CPU might receive a user request or information from the network, or might output information to the network in the course of performing the method steps described herein.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
obtaining a set of boundaries, the set of boundaries including boundaries for each of one or more bins, the boundaries for each of the one or more bins including a lower boundary and an upper boundary, wherein the set of boundaries of the one or more bins together define a contiguous range of data values capable of being stored in the one or more bins;

in an incremental process:

obtaining a single data value;

adding the single data value to one of the one or more bins according to the boundaries of the one or more bins;

after adding the single data value, determining by a processor whether to modify the set of boundaries; and modifying the set of boundaries incrementally after adding the single data value according to a result of the determining step such that the set of boundaries of the one or more bins together continue to define a contiguous range of data values capable of being stored in the one or more bins.

2. The method as recited in claim 1, further comprising:
generating or updating a model based, at least in part, upon a set of data values in at least one of the one or more bins.

3. The method as recited in claim 2, further comprising:
applying the model to generate a customer decision for one or more customers; and
applying the customer decision to the one or more customers.

4. The method as recited in claim 2, further comprising:
applying the model to identify content to serve to one or more customers; and
providing the content to the one or more customers.

5. The method as recited in claim 1, further comprising:
generating a set of indexes based, at least in part, upon a set of data values in at least one of the one or more bins.

6. The method as recited in claim 1, wherein obtaining the set of boundaries, obtaining the single data value, adding the single data value, determining whether to modify the set of boundaries, and modifying the set of boundaries are performed for each one of a plurality of data values, the plurality of data values corresponding to a particular variable, wherein the one or more bins are associated with the particular variable.

7. The method as recited in claim 6, wherein the particular variable is ordinal, continuous, discrete, binary, or nominal.

8. The method as recited in claim 6, wherein adding the data value to one of the bins is performed according to an order determined based, at least in part, upon a type of the particular variable.

9. The method as recited in claim 6, wherein the particular variable is associated with a user feature.

10. The method as recited in claim 1, wherein determining whether to modify the set of boundaries is performed in response to adding the data value to one of the one or more bins.

11. The method as recited in claim 1, wherein the boundaries of each one of the one or more bins define a different corresponding subset of the contiguous range of data values, the subset of the contiguous range of data values being capable of being stored in the corresponding one of the one or more bins.

12. The method as recited in claim 1, further comprising:
ascertaining a number of data values in each of the one or more bins;
wherein determining whether to modify the set of boundaries is performed, at least in part, upon an optimal number of data values in each of the one or more bins and the ascertained number of data values in each of the one or more bins.

13. The method as recited in claim 1, wherein modifying the set of boundaries according to a result of the determining step comprises:
adding a boundary to the boundaries of the one or more bins such that a bin is added to the one or more bins.

14. The method as recited in claim 1, wherein modifying the set of boundaries according to a result of the determining step comprises:
eliminating at least one of the boundaries of at least one of the one or more bins such that at least one of the one or more bins is eliminated.

15. The method as recited in claim 1, wherein determining by a processor whether to modify the set of boundaries comprises determining by the processor whether to perform a boundary adjustment of at least one of the boundaries for at least one of the one or more bins; and wherein modifying the set of boundaries according to a result of the determining step comprises:
adjusting at least one of the boundaries of at least one of the one or more bins according to the result of the determining step.

16. The method as recited in claim 1, further comprising:
maintaining a set of counts including a count for each unique data value in the plurality of data values, the count indicating a number of times the unique data value occurs in the plurality of data values.

17. The method as recited in claim 1, wherein the data single value is single numerical value.

18. An apparatus, comprising:
a processor; and
a memory, at least one of the processor or the memory being adapted for:
obtaining boundaries for each of one or more bins, the boundaries for each of the one or more bins including a lower boundary and an upper boundary, wherein the boundaries of the one or more bins together define a contiguous range of data values capable of being stored in the one or more bins;
in an incremental process:
obtaining a single data value;
adding the single data value to one of the one or more bins according to the boundaries of the one or more bins;
after adding the single data value, determining whether to perform a boundary adjustment of at least one of the boundaries for at least one of the one or more bins; and
adjusting at least one of the boundaries of at least one of the one or more bins incrementally after adding the single data value according to a result of the determining step such that the boundaries of the one or more bins together continue to define a contiguous range of data values capable of being stored in the one or more bins.

19. The apparatus as recited in claim 18, at least one of the processor or the memory being adapted for performing steps, further comprising:
generating or updating a model based, at least in part, upon a set of data values in at least one of the one or more bins.

20. The apparatus as recited in claim 19, at least one of the processor or the memory being adapted for performing steps, further comprising:
applying the model to generate a customer decision for one or more customers; and
applying the customer decision to the one or more customers.

21. The apparatus as recited in claim 18, wherein obtaining the boundaries, obtaining the single data value, adding the single data value, determining whether to perform the boundary adjustment, and adjusting at least one of the boundaries are performed for each one of a plurality of data values, the plurality of data values corresponding to a particular variable, wherein the one or more bins are associated with the particular variable.

22. The apparatus as recited in claim 18, wherein the boundaries of each one of the one or more bins define a different corresponding subset of the contiguous range of data values, the subset of the contiguous range of data values being capable of being stored in the corresponding one of the one or more bins.

23. The apparatus as recited in claim 18, further comprising:
compressing at least a portion of the data values in at least one of the one or more bins.

24. The apparatus as recited in claim 18, at least one of the processor or the memory being adapted for performing steps, further comprising:
ascertaining a number of data values in each of the one or more bins; wherein determining whether to adjust at least one of the boundaries of at least one of the one or more bins is performed, at least in part, upon an optimal number of data values in each of the one or more bins and the ascertained number of data values in each of the one or more bins.

25. The apparatus as recited in claim 18, wherein determining whether to perform the boundary adjustment for at least one of the one or more bins comprises calculating a mean-squared error (MSE) between a vector of ideal number of data values per bin and a vector of current number of data values per bin; and
wherein adjusting at least one of the boundaries of at least one of the one or more bins according to the result of the determining step is performed such that the MSE between the vector of ideal number data values per bin and the vector of current number of data values per bin is minimized.

26. The apparatus as recited in claim 18, wherein determining comprises performing a hill climbing algorithm.

27. The apparatus as recited in claim 18, wherein adjusting at least one of the boundaries of at least one of the one or more bins according to the result of the determining step is performed such that the contiguous range of data values capable of being stored in the one or more bins is increased or decreased.

28. The method as recited in claim 18, wherein determining whether to perform the boundary adjustment for at least one of the one or more bins is performed in response to adding the data single value to one of the one or more bins.

29. The apparatus as recited in claim 18, wherein adjusting at least one of the boundaries of at least one of the one or more bins according to the result of the determining step comprises:
adjusting at least one of the boundaries of at least one of the one or more bins to approximate an optimum number of data values for each of the one or more bins according to a desired distribution.

30. The apparatus as recited in claim 18, wherein determining whether to perform the boundary adjustment comprises:
determining whether to adjust at least one of the boundaries in order to maintain or achieve an approximately optimal distribution of data values in the one or more bins.

31. The apparatus as recited in claim 18, wherein adding the single data value, determining whether to perform the boundary adjustment, and adjusting at least one of the boundaries are performed during an adaptive binning process.

32. The apparatus as recited in claim 18, wherein adjusting at least one of the boundaries of at least one of the one or more bins according to a result of the determining step comprises adjusting two boundaries of the set of boundaries, wherein the two boundaries separate two adjoining bins in the one or more bins.

33. The apparatus as recited in claim 32, wherein the two boundaries comprise an upper boundary of a first one of the two adjoining bins and a lower boundary of a second one of the two adjoining bins.

34. A non-transitory computer-readable medium storing thereon computer-readable instructions, comprising:
instructions for obtaining boundaries for each of one or more bins, the boundaries for each of the one or more bins including a lower boundary and an upper boundary, wherein the boundaries of the one or more bins together define a contiguous range of data values capable of being stored in the one or more bins;
instructions for an incremental process, the instructions for the incremental process comprise:
instructions for obtaining a single data value;
instructions for adding the single data value to one of the one or more bins according to the boundaries of the one or more bins;
instructions for determining whether to perform a boundary adjustment of at least one of the boundaries for at least one of the one or more bins, after adding the single data value; and
instructions for adjusting at least one of the boundaries of at least one of the one or more bins incrementally after adding the single data value according to a result of the determining step such that the boundaries of the one or more bins together continue to define a contiguous range of data values capable of being stored in the one or more bins.

35. The non-transitory computer-readable medium as recited in claim 34, further comprising:
instructions for generating or updating a model based, at least in part, upon a set of data values in at least one of the one or more bins.

36. The non-transitory computer-readable medium as recited in claim 35, further comprising:
instructions for applying the model to generate a customer decision for one or more customers; and
instructions for applying the customer decision to the one or more customers.

37. The non-transitory computer-readable medium as recited in claim 34, wherein obtaining the boundaries, obtaining the data value, adding the data value, determining whether to perform the boundary adjustment, and adjusting at least one of the boundaries are performed for each one of a plurality of data values, the plurality of data values corresponding to a particular variable, wherein the one or more bins are associated with the particular variable.

38. The non-transitory computer-readable medium as recited in claim 37, further comprising instructions for maintaining a set of counts including a count for each unique data value in the plurality of data values, the count indicating a number of times the unique data value occurs in the plurality of data values.

39. The non-transitory computer-readable medium as recited in claim 38, wherein adding the one of the plurality of data values comprises
determining whether a count for the one of the plurality of data values exists in the set of counts; and incrementing or generating the count for the one of the plurality of data values according to a result of determining whether the count for the one of the plurality of data values exists in the set of counts.

40. The non-transitory computer-readable medium as recited in claim 39, further comprising:
instructions for depreciating the count for each other unique data value in the plurality of data values.

41. The non-transitory computer-readable medium as recited in claim 38, further comprising:
instructions for depreciating each count in the set of counts.

42. The non-transitory computer-readable medium as recited in claim 37, wherein each one of the plurality of data values has a time associated therewith, wherein the time indicates when the corresponding one of the plurality of values was obtained or received, the non-transitory computer-readable medium further comprising:
instructions for deleting one or more of the plurality of data values from the one or more bins based, at least in part, upon the time associated therewith.

43. The non-transitory computer-readable medium as recited in claim 37, further comprising:
instructions for depreciating the plurality of data values.

44. The non-transitory computer-readable medium as recited in claim 37, further comprising:
instructions for compressing at least a subset of data values in one of the one or more bins, the subset of data values being a subset of the plurality of data values.

45. The non-transitory computer-readable medium as recited in claim 44, wherein compressing comprises:
merging the subset of data values within the one of the one or more bins to a single merged data value.

46. The non-transitory computer-readable medium as recited in claim 45, further comprising:
maintaining a set of counts including a count for each unique data value in the plurality of data values, the count indicating a number of times the unique data value occurs in the plurality of data values;
wherein merging the subset of data values includes merging the count for each of the subset of the data values to a single count corresponding to the single merged data value.

47. The non-transitory computer-readable medium as recited in claim 34, wherein the one or more data values are added such that the data values are ordered according to an intrinsic or extrinsic order.

48. An apparatus, comprising:
means for obtaining a set of boundaries, the set of boundaries including boundaries for each of one or more bins, the boundaries for each of the one or more bins including a lower boundary and an upper boundary, wherein the set of boundaries of the one or more bins together define a contiguous range of data values capable of being stored in the one or more bins;
means for performing an incremental process, the means for performing the incremental process comprises:
means for obtaining a single data value;
means for adding the single data value to one of the one or more bins according to the boundaries of the one or more bins;
means for determining whether to modify the set of boundaries, after adding the single data value; and
means for modifying the set of boundaries incrementally after adding the single data value according to a result of the determining step such that the set of boundaries together continue to define a contiguous range of data values capable of being stored in the one or more bins.

\* \* \* \* \*